United States Patent [19]

Rourke et al.

[11] Patent Number: 4,757,348

[45] Date of Patent: Jul. 12, 1988

[54] HIGH SPEED ELECTRONIC REPROGRAPHIC/PRINTING MACHINE

[75] Inventors: John L. Rourke, Fairport; Robert F. Buchheit, Webster; Barbara L. Farrell, Fairport, all of N.Y.

[73] Assignee: Xerox Corporation, Stamford, Conn.

[21] Appl. No.: 931,484

[22] Filed: Nov. 17, 1986

[51] Int. Cl.⁴ ............................................ G03G 15/00
[52] U.S. Cl. ..................... 355/6; 355/14 C; 355/14 R
[58] Field of Search ............ 355/6, 14 C, 14 R; 346/160; 358/300

[56] References Cited

U.S. PATENT DOCUMENTS

| 3,687,256 | 8/1972 | Jones | 197/1 R |
|---|---|---|---|
| 3,936,182 | 2/1976 | Sheikh | 355/14 |
| 3,986,449 | 10/1976 | Hamisch, Jr. et al. | 101/93.04 |
| 4,248,528 | 2/1981 | Sahay | 355/14 R |
| 4,494,862 | 1/1985 | Tanaka | 355/14 C |
| 4,602,776 | 7/1986 | York et al. | 355/6 X |
| 4,609,283 | 9/1986 | Murata et al. | 355/14 R |

FOREIGN PATENT DOCUMENTS 0052863 3/1985 Japan .................. 355/14 C

OTHER PUBLICATIONS

Noyes, "Transparent Carrier for Entry of Job Control Information in Copier", IBM Disclosure Bulletin, 2/76, pp. 2808-2809.

Primary Examiner—Patrick R. Salce
Assistant Examiner—Kristine Peckman
Attorney, Agent, or Firm—Frederick E. McMullen

[57] ABSTRACT

An electronic reprographics/printing machine with at least one scanning array for converting images on documents to image signals, a document tray for holding a stack of the documents to be scanned, a document transport to bring the documents from the tray to the array for scanning, a controller, an input device such as a keyboard, mouse, touch display, etc. for programming in programming parameters with an associated separator code, a control sheet with a bar code representation of the same separator code for interleaving with the documents for scanning by the array, a bar code discriminator for distinguishing documents with bar codes from documents without bar codes, a bar code reader for reading the bar code to identify the separator code thereon, and a control to match the separator code obtained from the control sheet with the separator code associated with the programming parameters whereby the controller operates the machine in accordance with the program parameters.

19 Claims, 21 Drawing Sheets

MAIN PROGRAM

MAIN PROGRAM CON'T.

SERIALIO$INIT PROCEDURE

EXIT PROCEDURE (CALLED FROM A NUMBER OF PROCEDURES AFTER ERROR CHECKS. END OF PROCESSING UNTIL NEXT PAGE)

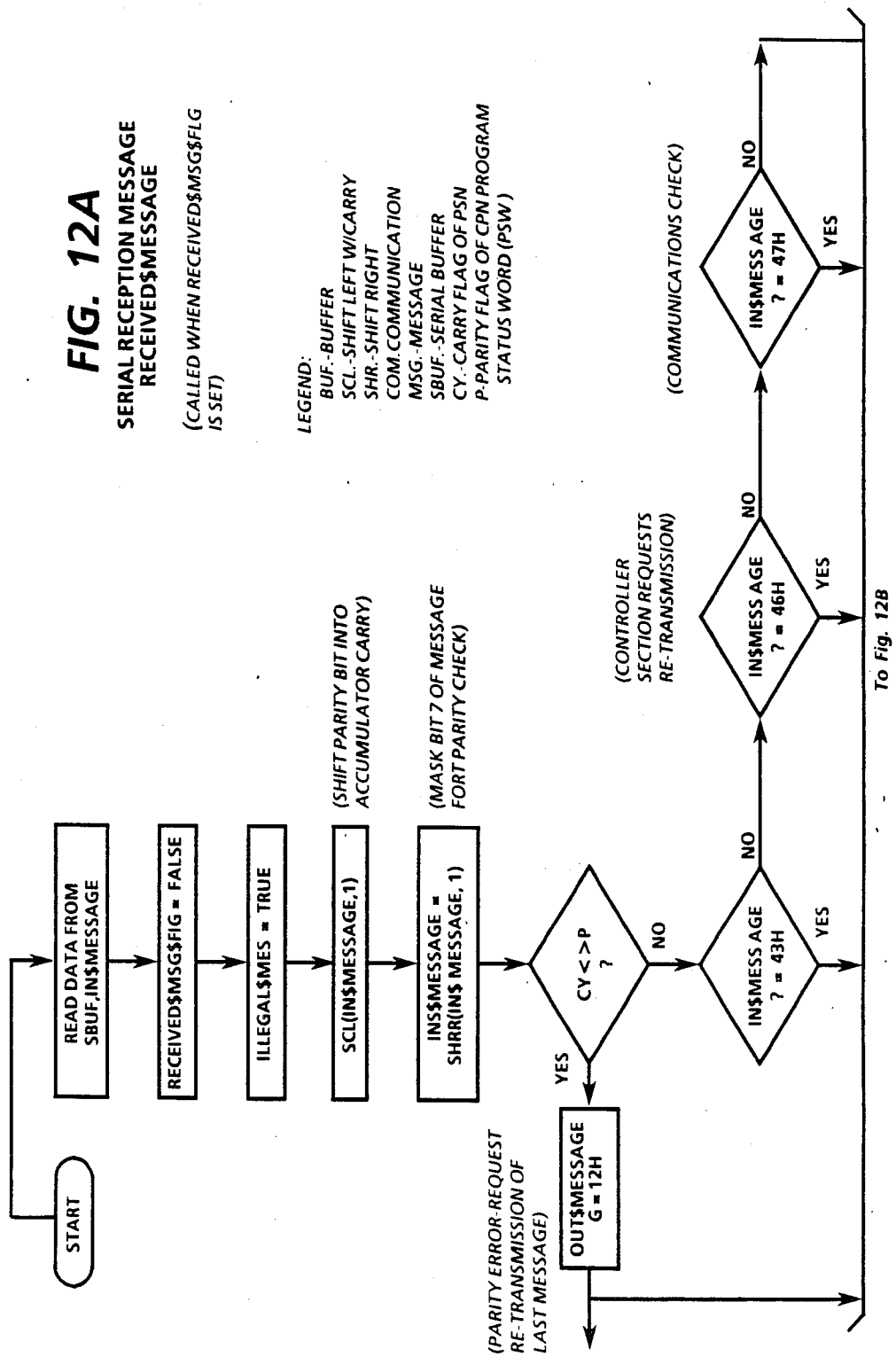

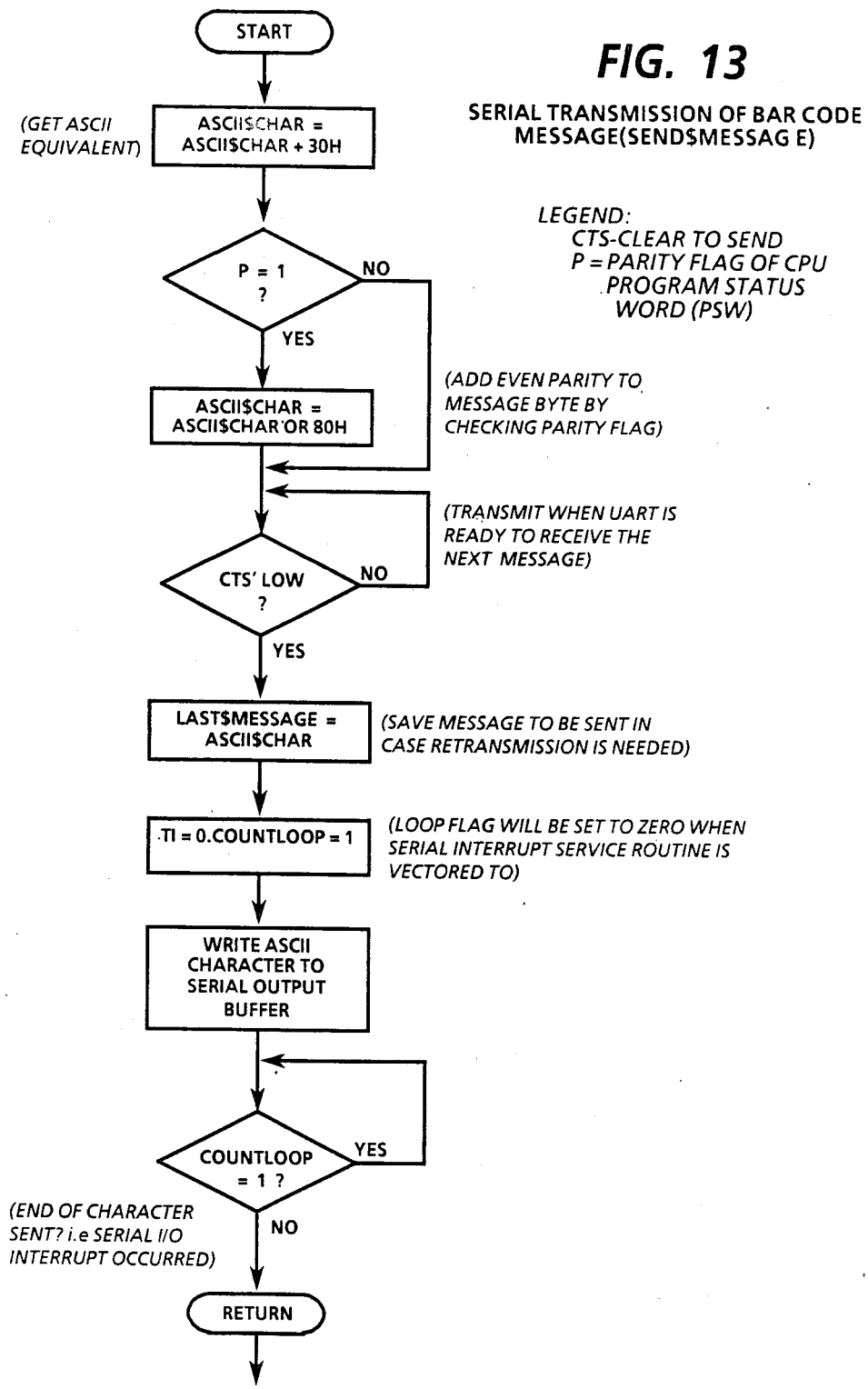

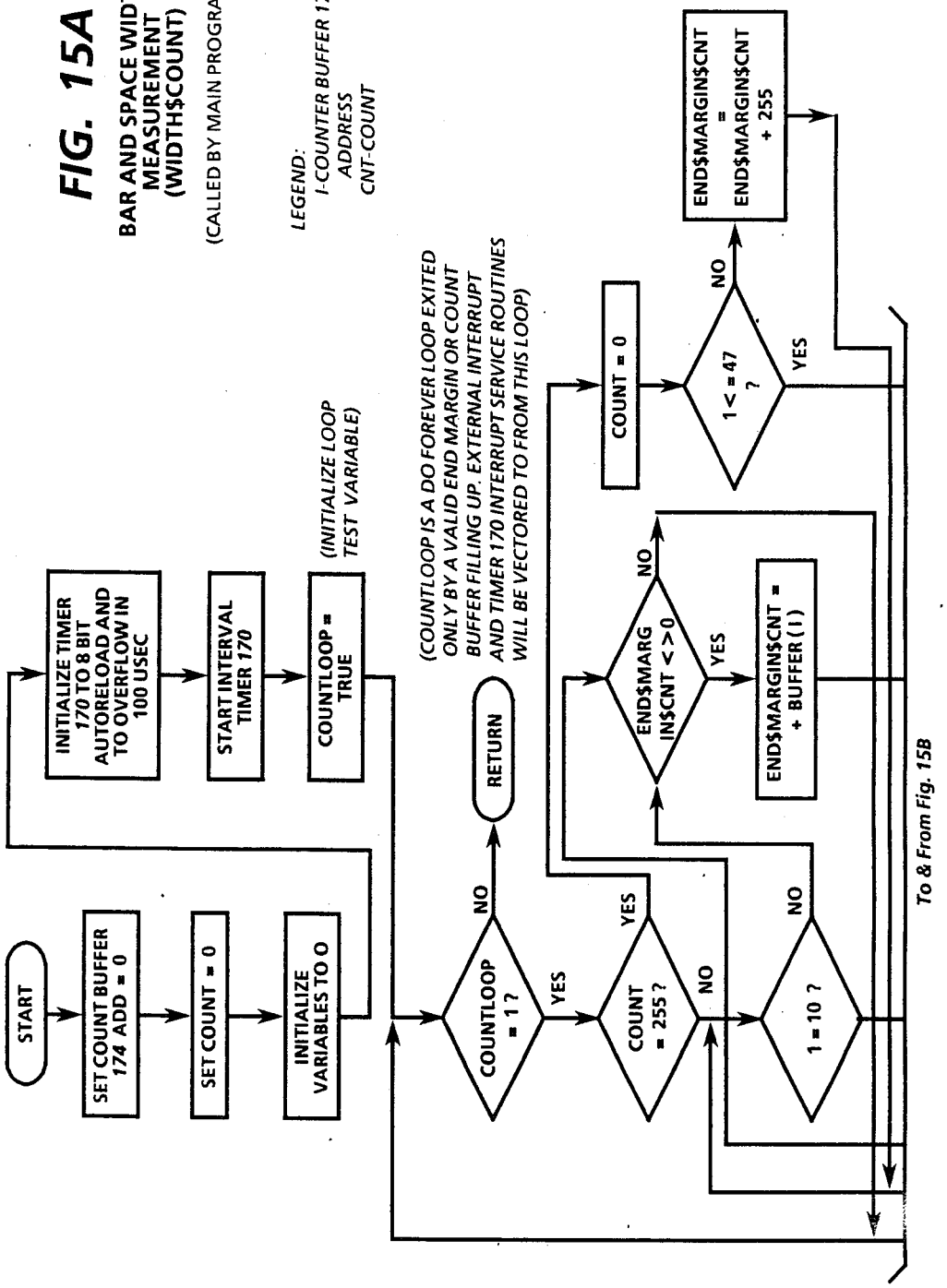

BAR AND SPACE WIDTH MEASUREMENT
(COUNT BUFFER LOADING)

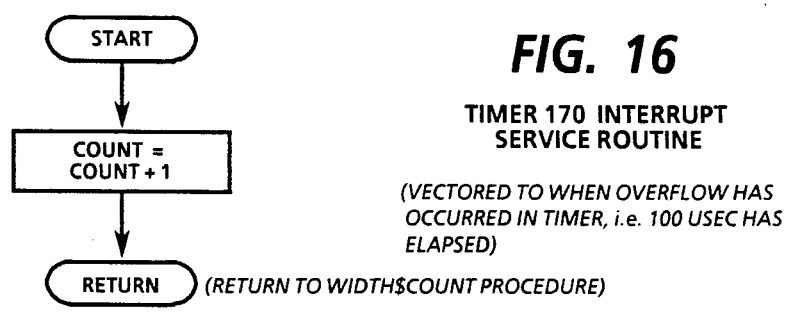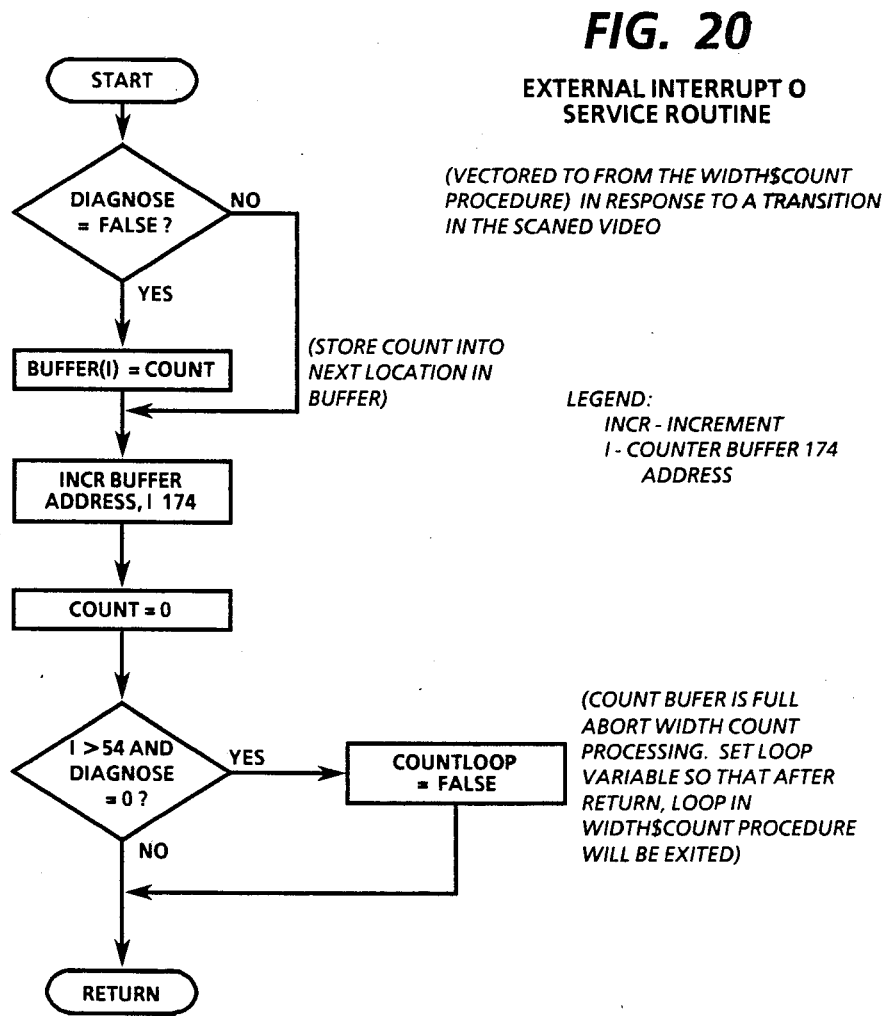

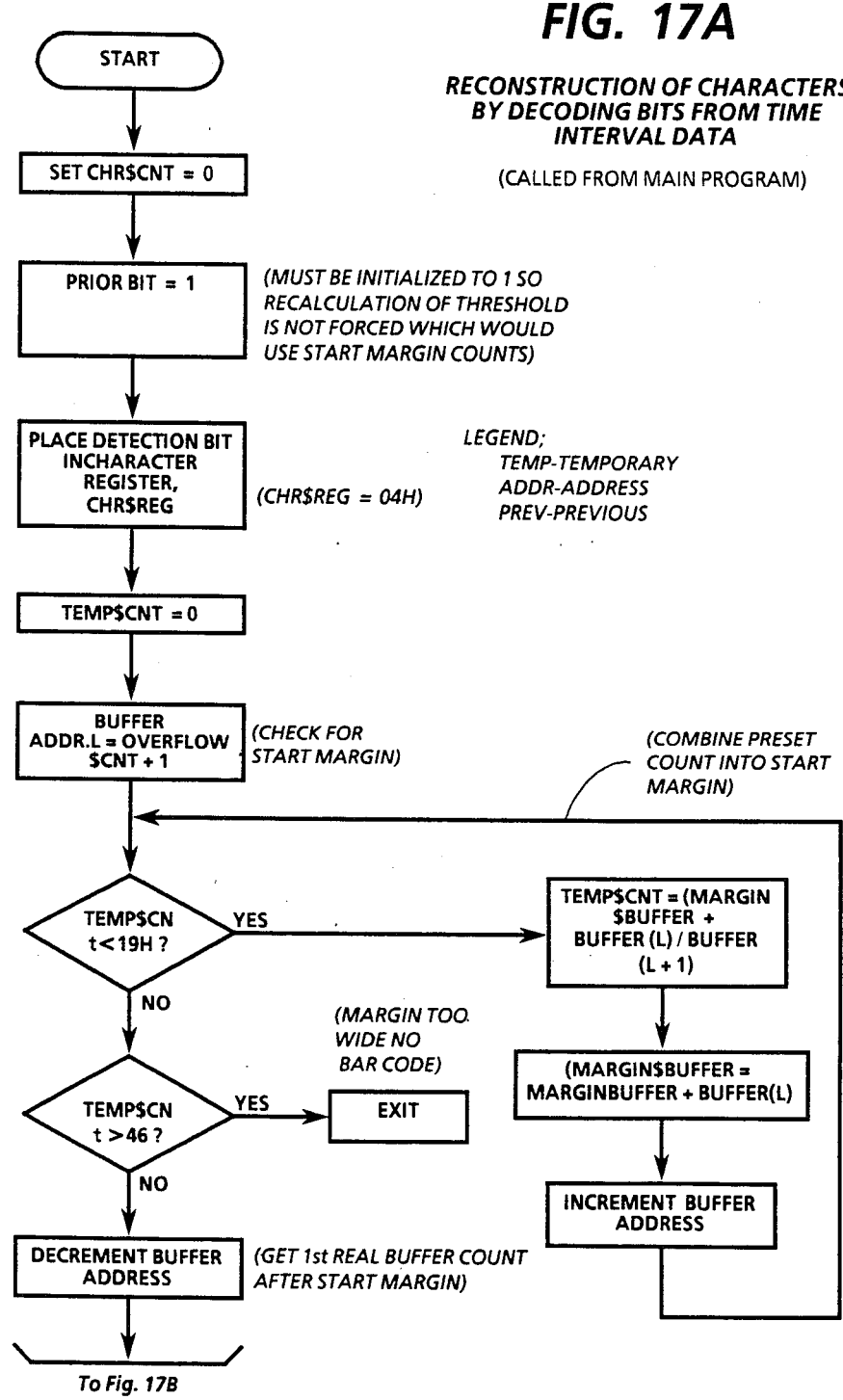

CHECKSUM VERIFICATION

HIGH SPEED ELECTRONIC REPROGRAPHIC/PRINTING MACHINE

The invention relates to high speed electronic reprographic/printing machines, and particularly to an improved high speed electronic printing machine employing job and page separators to enhance machine throughput and improve operator efficiency.

High speed electronic copier, printing, and reprographics machines convert original images into image signals or pixels, and in that form process the image signals to provide the desired output which typically is in the form of prints. Machines of this type naturally are and indeed expected to be highly automated to speed up job production and reduce operator time and involvement to the barest minimum.

Unfortunately, the image source is usually in the form of sheet material, commonly referred to as a document or document original. In order to handle documents for printing, the machine employs a scanner of some type to scan the document image and convert the same to video image signals or pixels. A storage buffer can be provided so that each document need only be scanned once and the image signals then stored for subsequent processing and use in making multiple prints. However, an unnecessarily large amount of operator time and involvement is still necessary in cases where the operator is required to manually place each document in position at the document scanning station and then following completion of the scan, remove the document to clear the way for the next document. To avoid this and relieve the operator of this burden, a document handler may be used which automatically brings each document that is to be scanned forward from a document stack to the scanning station. Following scanning, the document handler automatically removes the document to clear the way for the next document.

Since machines of this type, because of their high capacity, speed, and versatility, are deemed to be particularly suitable for use in commercial printing establishments, inplant printers, etc., machine throughput capability represents an important and indeed critical factor. This requirement further enhances the need to reduce operator involvement in the process to the barest minimum. Accordingly, to enhance machine desirability and reduce operator involvement, machines of this type must be designed to not only to handle a large number of documents at once but to also provide a wide variety of document and image processing options, such as document input/output characteristics, image cropping, image enlargement or reduction, image merging, etc. Thus, even if an effective document handler is provided to alleviate the need for the operator to manually feed documents, requiring the operator to stand by in order to program the machine for each job is self defeating, and wasteful of operator time and further offsets some of the gain achieved by a document handler.

To reduce the need for continuous operator involvement and attention, control sheets inserted at selected points in the document stack to segregate and distinguish different jobs from one another have been suggested in the prior art as evidenced by U.S. Pat. No. 4,248,528 to Sahay et al. But, in that prior art patent, a separate reader is employed to read and decipher the control data on the control sheet, adding to the complexity and expense of the machine. In that system, the reader must be positioned at a point above the document stack in order to view the separator sheets, a position which can interfere with access to the document supply tray and which in some cases can limit the maximum number of documents that can be placed in the documents supply tray.

The present invention seeks to address and overcome the problems presented by the prior art by providing an electronic reprographics/printing machine having in combination: single document scanning means for scanning documents to provide image signals representative of the document image control means for controlling operation of the machine in response to control instructions; a control sheet having at least one coded image which when scanned as a document by the scanning means provides control instructions for operating the machine to carry out a preset cycle, the control sheet being associated with the documents to be scanned so that the control sheet is scanned with the documents; and control sheet recognition means for distinguishing the control sheet from the other documents and converting the image signals derived from the control sheet to control instructions for input to the control means.

The invention further provides a method of operating an electronic reprographics/printing machine having a single scanning unit for scanning documents and converting the document images to image signals, means for processing the image signals to provide a desired output, and control means responsive to job control instructions for controlling the machine to provide the desired output, comprising the steps of: programming the machine with a preset job program for processing documents assembled in a job batch together with a job code; providing a special document in the form of a job separator having an image thereon representing the job code for combination with the documents in the job batch; combining the job separator with the documents in the job batch at a predetermined location in the job batch; sequentially scanning the documents in the job batch and converting the document images to image signals; identifying image signals derived from scanning the image on the job separator from image signals derived from scanning images on the other documents in the job batch; and converting the image signals from the job separator to the job code for input to the control means, the control means matching the job code derived from scanning the job separator with the job code previously programmed into the machine to provide the preset job program for processing the documents in the job batch.

IN THE DRAWINGS

Figures 10A, 10B:
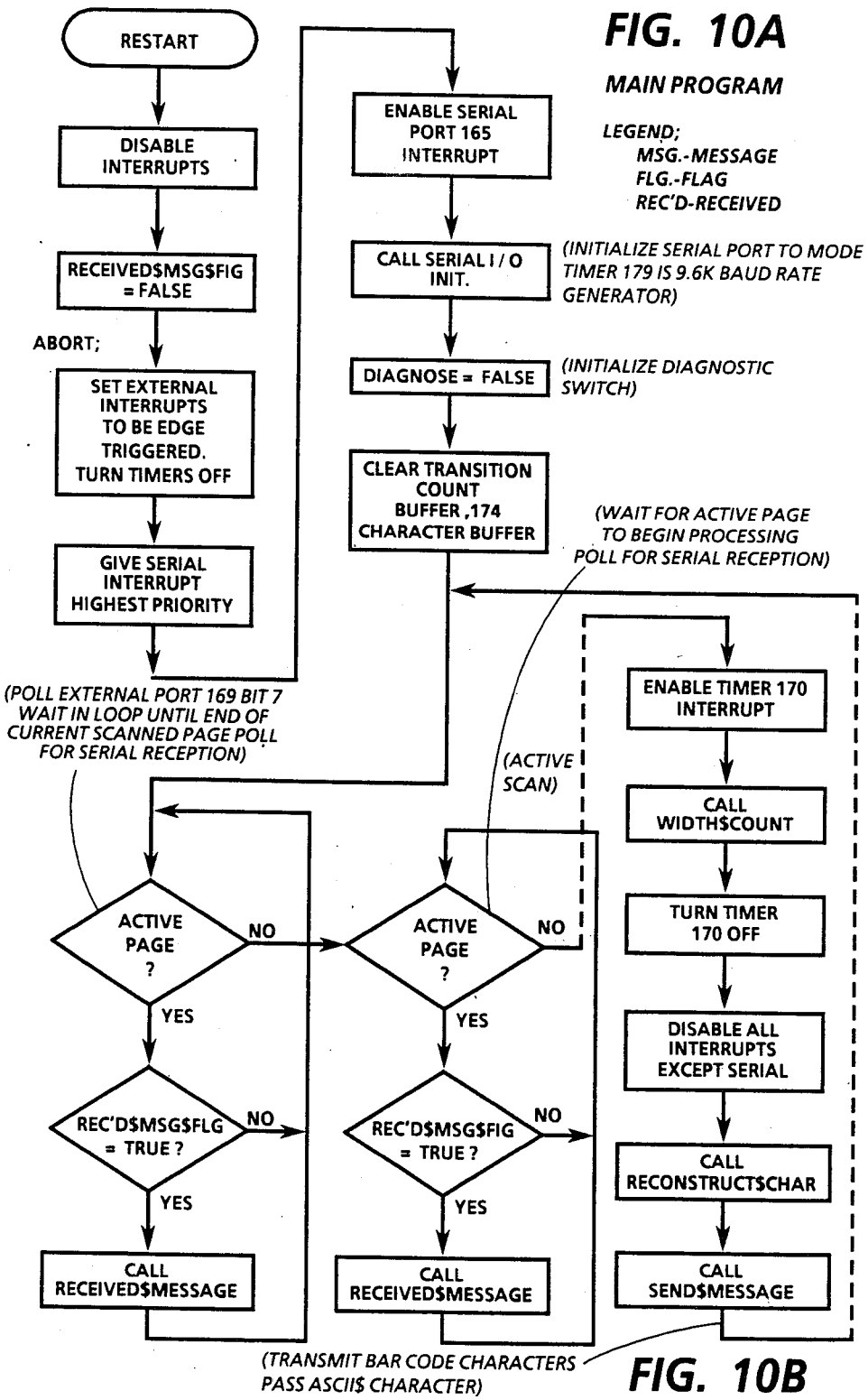
Figure 11:
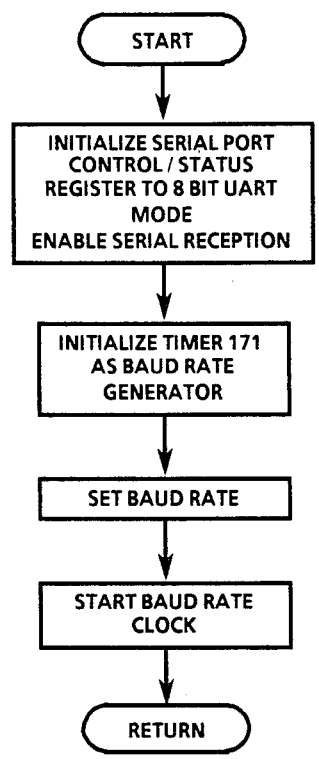
Figure 12B:
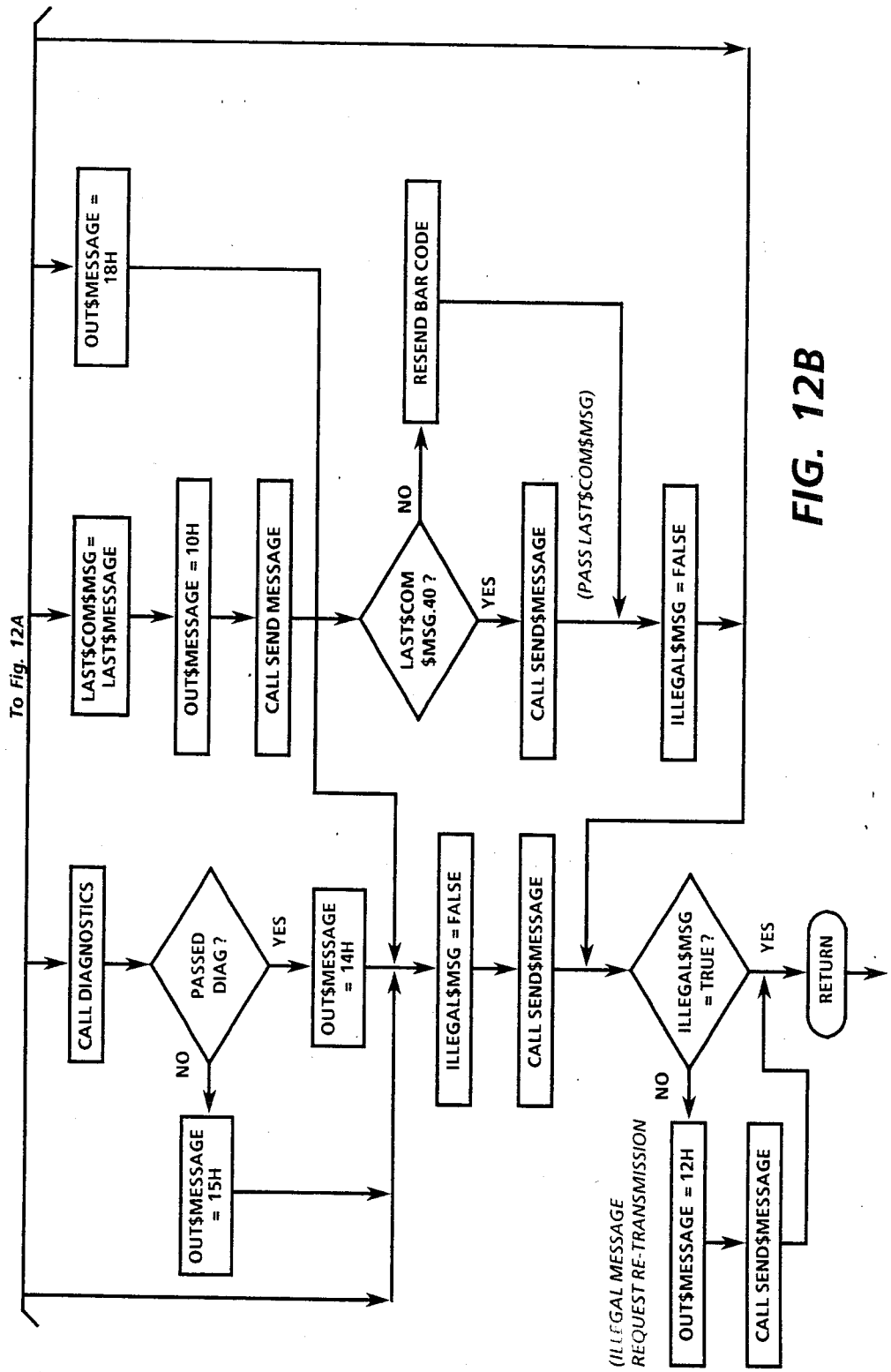
Figure 14:
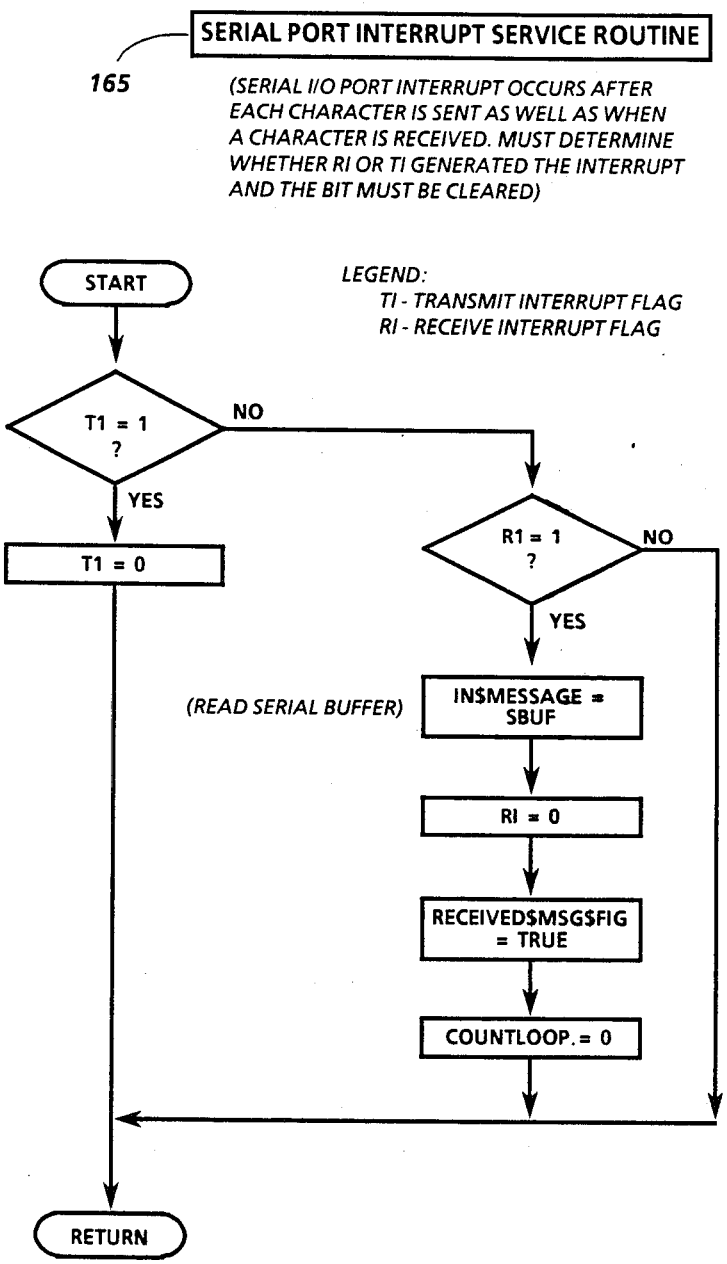
Figure 15B:
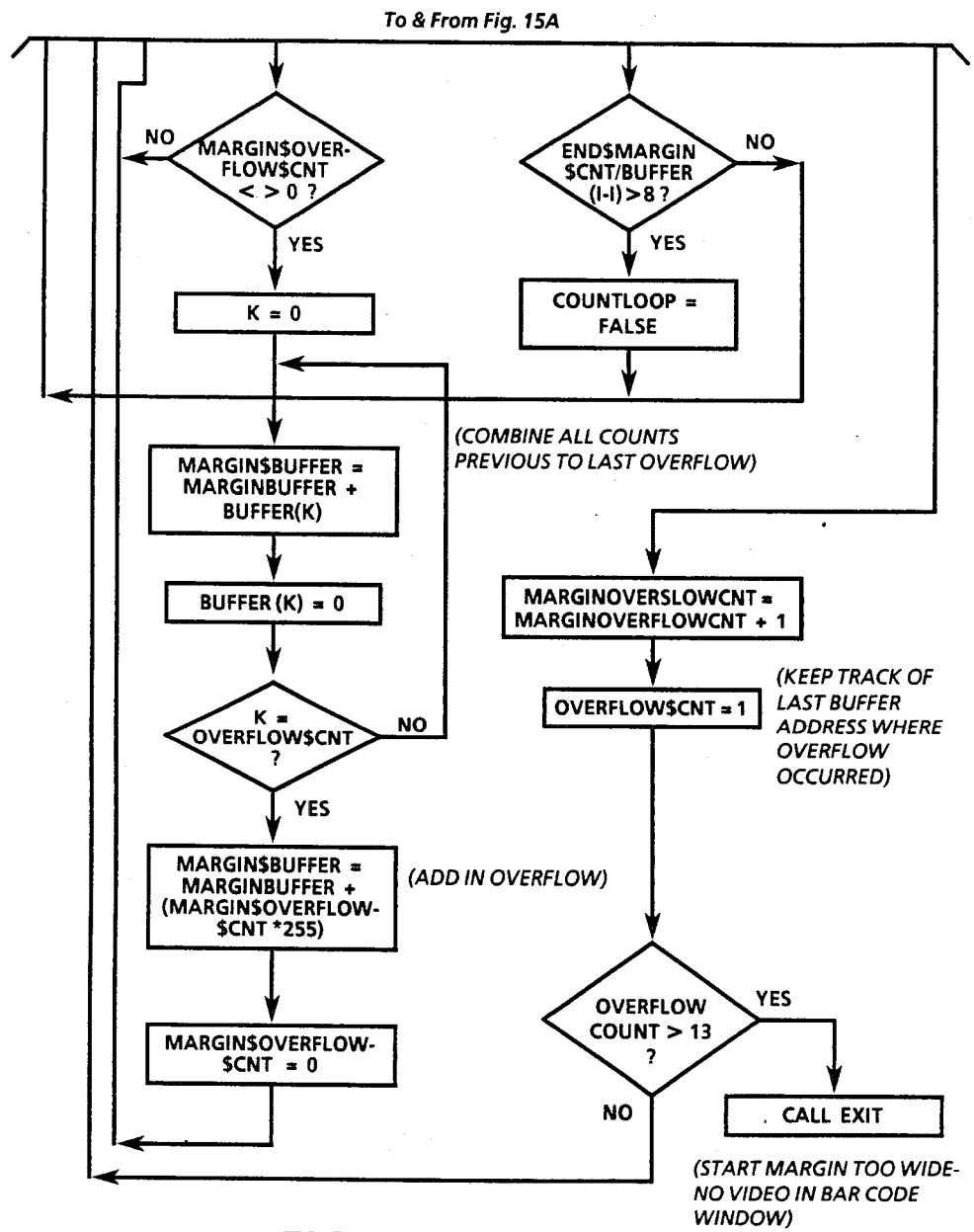
Figure 17B:
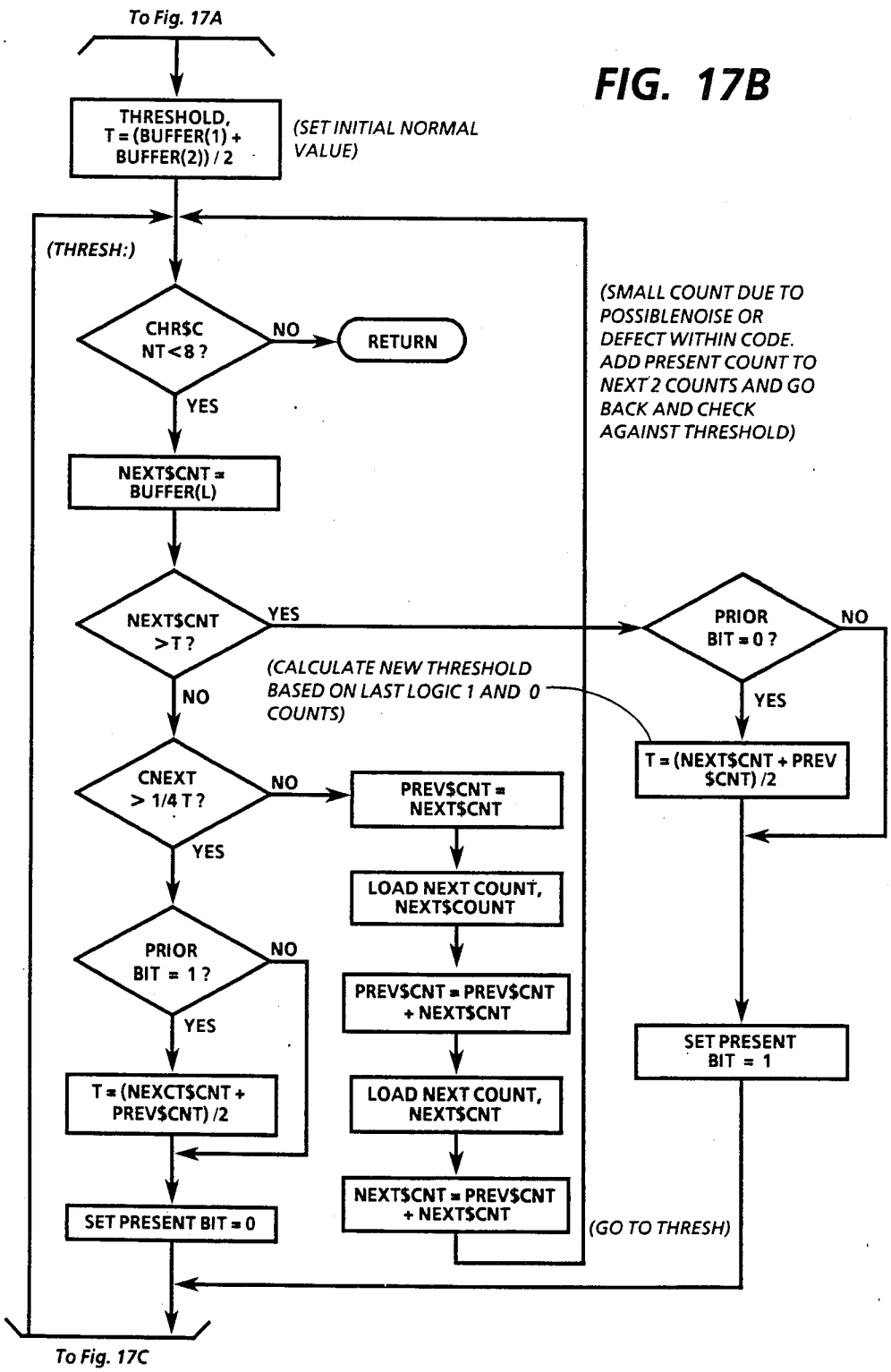
Figure 17C:
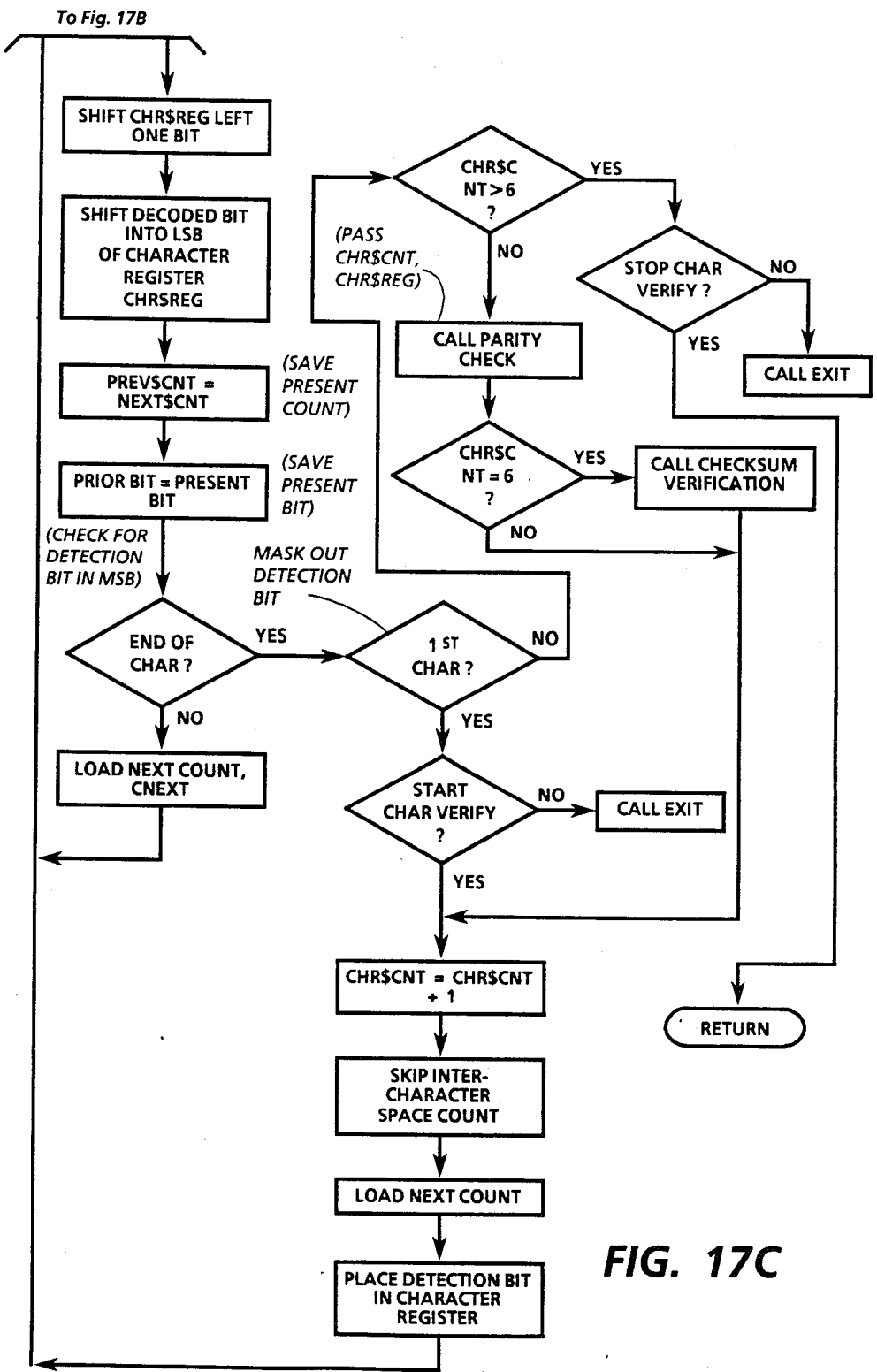
Figure 18A:
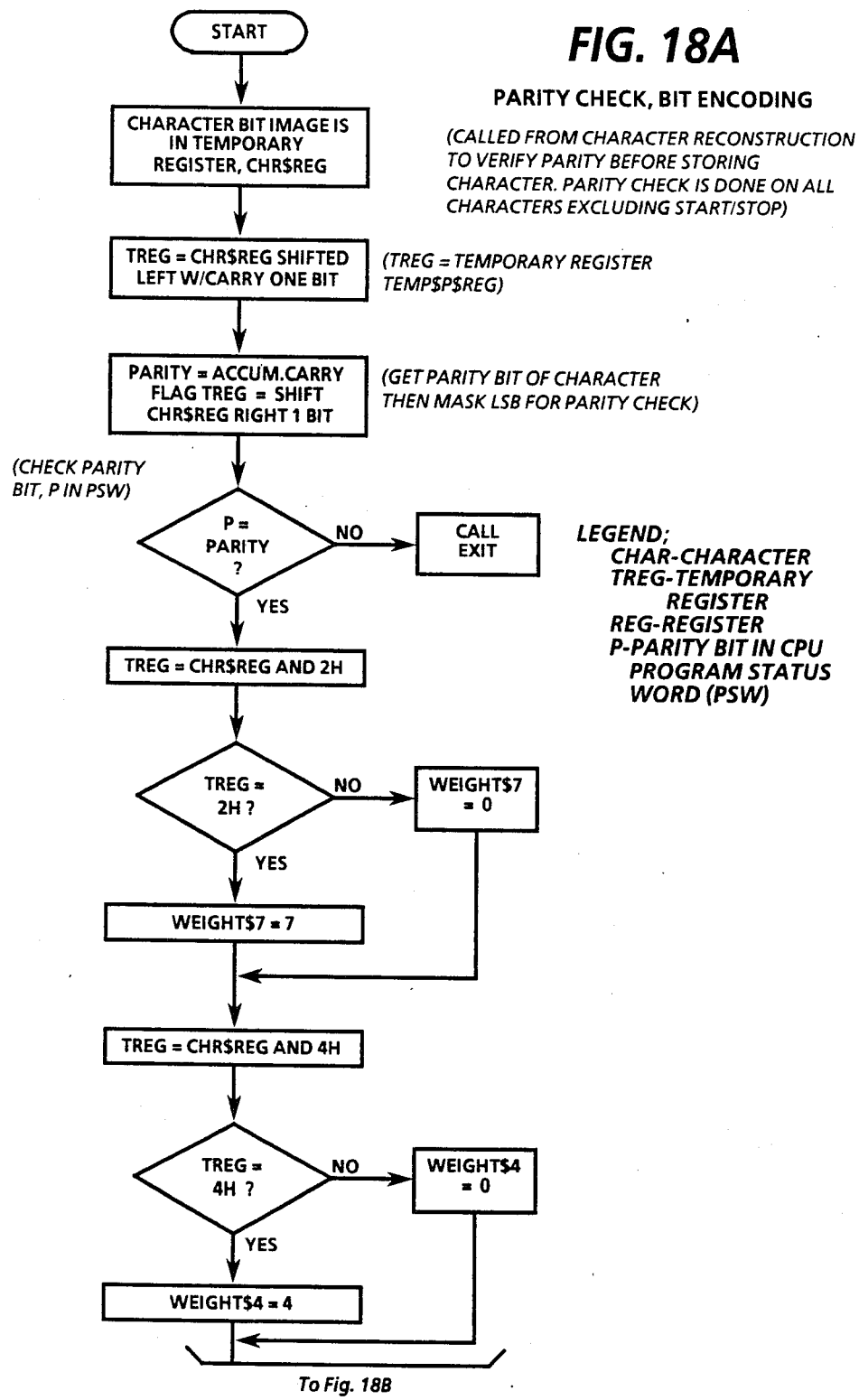
Figure 18B:
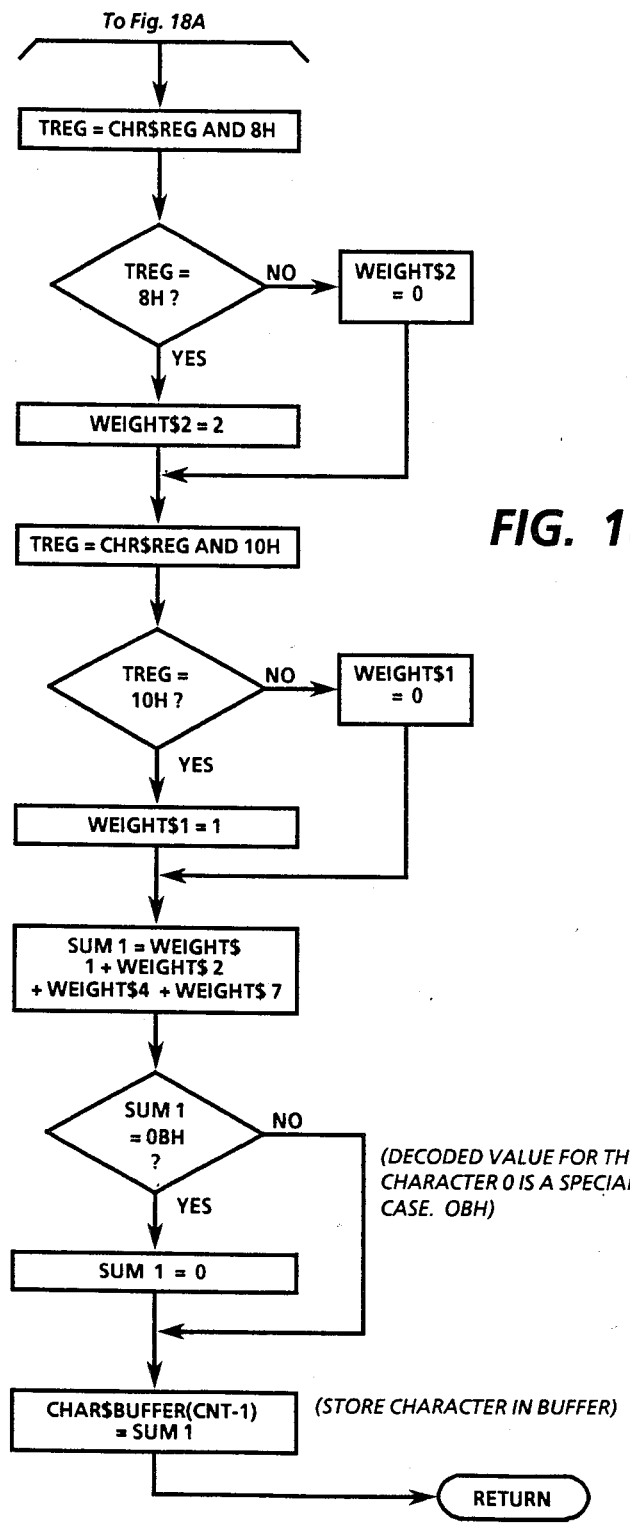
Figure 19:
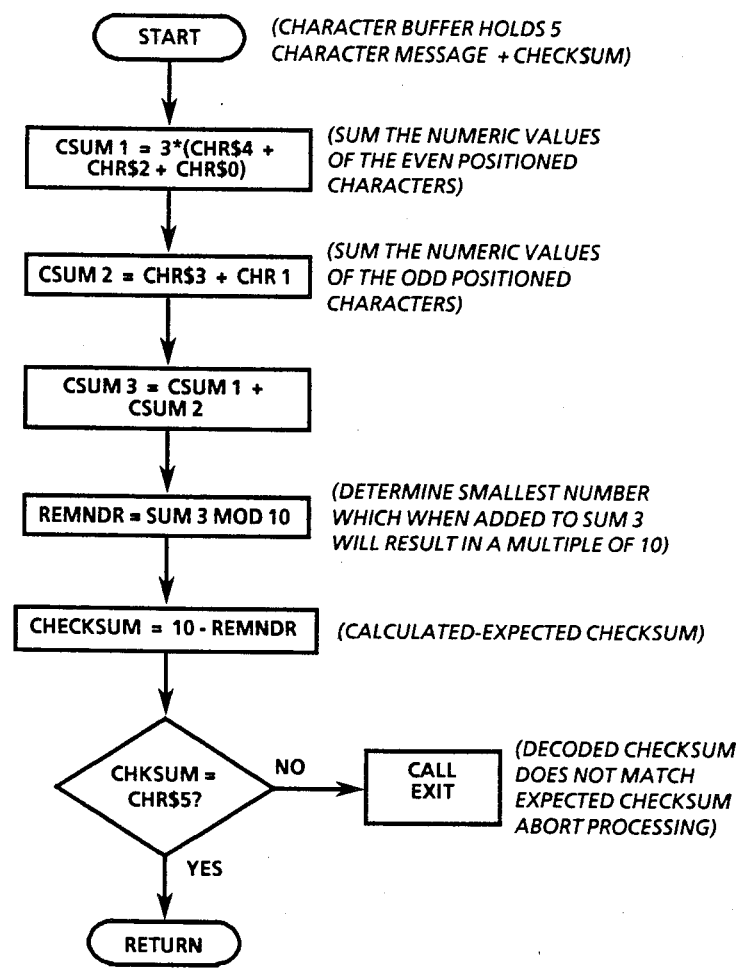

FIGS. 10a and 10b comprise a flow chart depicting the Main Program for processing bar codes;

FIG. 11 is a flow chart depicting the Serial I/O initialization routine;

FIGS. 12a and 12b comprise a flow chart depicting the Received Message routine;

FIG. 13 is a flow chart depicting the Send Message routine;

FIG. 14 is a flow chart depicting the Serial Port Interrupt Service routine;

FIGS. 15a and 15b comprise a flow chart depicting the Bar and Space Width Measurement routine;

FIG. 16 is a flow chart depicting the Timer Interrupt Service routine;

FIGS. 17a, 17b and 17c comprise a flow chart depicting the Reconstruction Of Character routine;

FIGS. 18a and 18b comprise a flow chart depicting the Parity Check, bit encoding routine;

FIG. 19 is a flow chart depicting the Checksum Verification routine;

FIG. 20 is a flow chart depicting the External Interrupt Service routine; and

Figure 21:
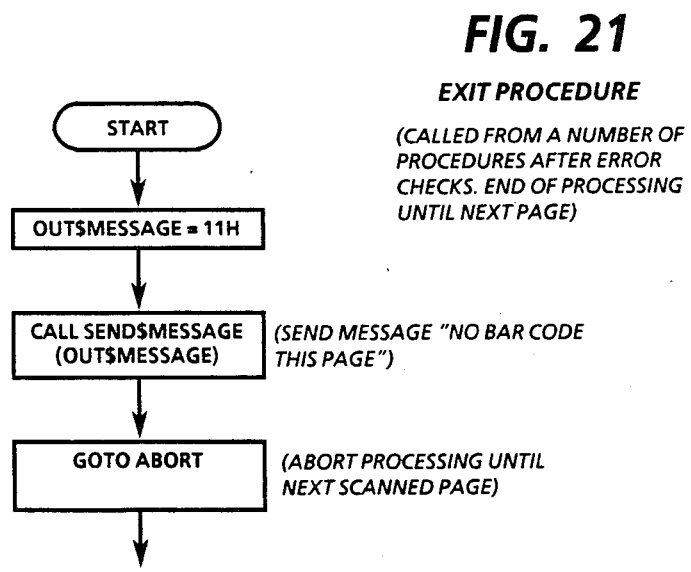

FIG. 21 is a flow chart depicting the Exit Procedure.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
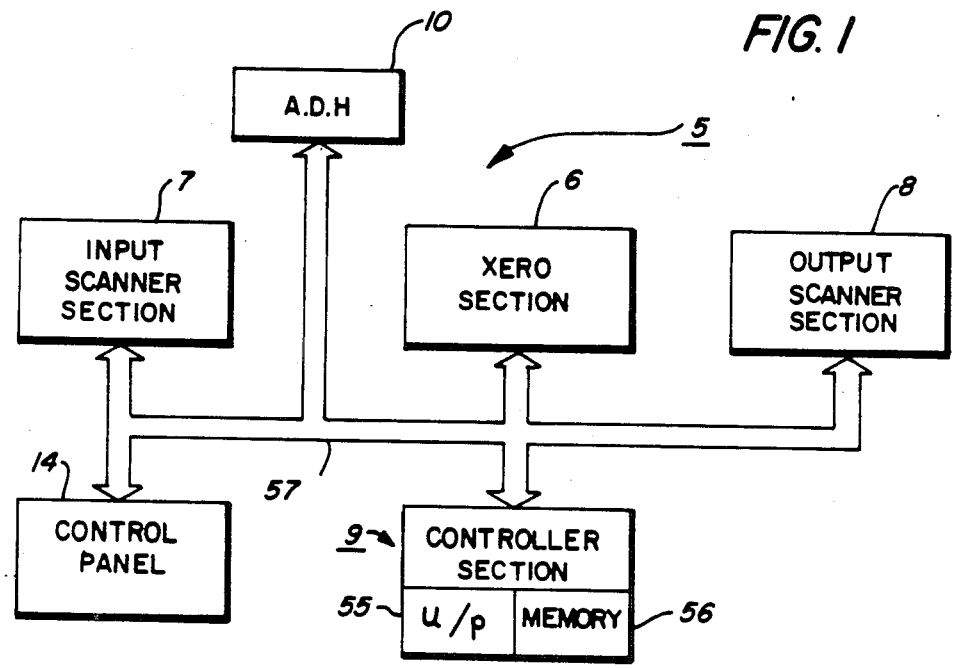
FIG. 1 is an isometric view of an electronic reprographics/printing machine of the type adapted for use with the present invention.
Figure 2:
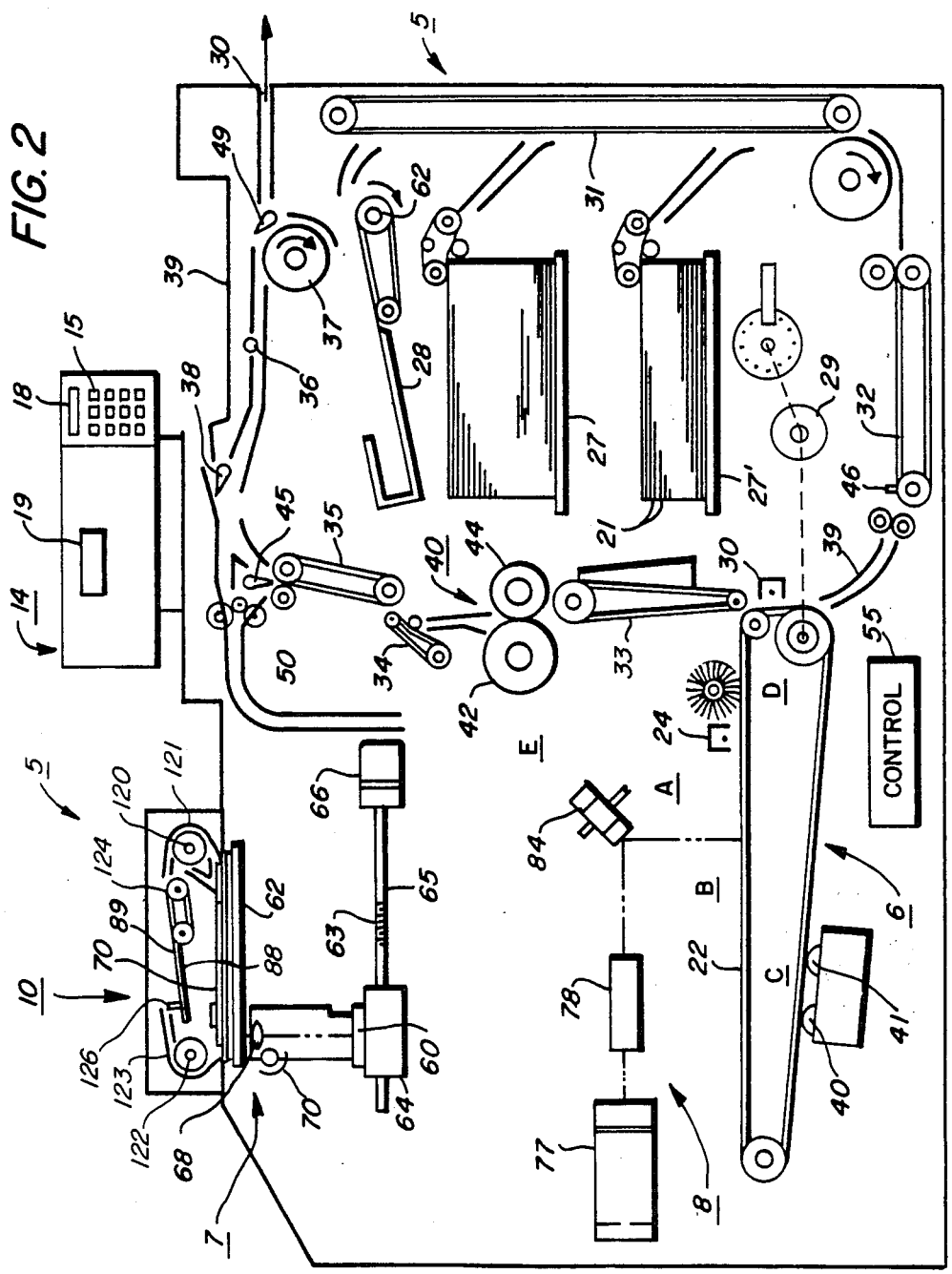
FIG. 2 is an enlarged view illustrating details of the machine shown in FIG. 1.

In the drawings, like reference numerals have been used throughout to designate identical elements. FIGS. 1 and 2 schematically depict the various components of an illustrative electronic reprographics/printing machine 5 of the type adapted to use the present invention therein. Machine 5 is a xerographic based input/output scanner having a xerographic section 6, document input scanner section 7, raster output scanner section 8, and controller section 9. Machine 5 also includes an automatic document handler 10. It will become evident from the following discussion that the invention is equally well suited for use in a wide variety of applications including not only the particular machine shown herein, but other machines such as a scanner alone, a combination scanner with copier, etc.

A control panel 14 allows the user or operator to select various machine functions and function combinations which the machine is capable of performing such as copy size, copy contrast, number of copies, the manner (duplex, for example) in which the copies are to be made, etc. Panel 14 includes programming means in the form of a numeric keyboard 15 ordinarily used by the operator for programming in the number of copies to be made. Other additional selection selectors (not shown) may be provided for programming in various operating features of which machine 5 is capable, such as duplex copying, etc. One or more display panels, such as a multi-digit (i.e. eight) numeric display array 18 which displays the number programmed by keyboard 15, are provided for informing the operator of the operating status of machine 5, identifying machine faults, etc. A Start/Print button 19 is provided on control panel 14 for starting a machine print cycle.

Other types of operator programming/information devices such as a mouse, touch display, etc. may instead be contemplated either in addition to or in place of the machine programming/information devices described above. Further, as will be understood, operator programming/information devices may be integral with machine 5 or may be separate from and remotely located with respect to machine 5.

Inasmuch as the electronic reprographics/printing art is well known, the various processing stations employed in machine 5 will be shown hereinafter schematically and their operation described briefly with reference thereto.

Xerographic section 6 includes a photoreceptor in the form of a belt 22 having a photoconductive surface thereon such as a selenium alloy. Belt 22 is driven by main drive motor 29 and moves in the direction of arrow 23 to advance the photoconductive surface through a charging station A where a corona generating device 24 charges the photoconductive surface of belt 22 to a relatively high substantially uniform potential. Following charging, the charged photoconductive surface is exposed at an imaging station B to create a latent electrostatic image of the copy being printed on the photoconductive surface.

A plurality of sheet transports 31, 32, 33, 34, 35, 36, and 37, which are suitably driven from main drive motor 29, cooperate with suitable sheet guides to form a paper path through which the copy sheets 21, drawn from either main or auxiliary paper supply trays 27 or 27', or from duplex paper supply tray 28, pass during processing. Finished copies are output by gate 38 to either top tray 39 or through a discharge path 30 to an external copy sheet handler such as a sorter (not shown). Suitable copy sheet sensors are provided at discrete points along the copy sheet path to provide control information and identify sheet jams.

The latent electrostatic image formed on the photoconductive surface of photoreceptor 22 is developed at a developing station C by means of a pair of magnetic brush developer rollers 40, 41 which bring a suitable developer material into contact with the electrostatic latent image. The latent image attracts toner particles from the carrier granules of the developer material to form a toner powder image on the photoconductive surface of belt 22. Thereafter, the developed image is transferred to a copy sheet 21 at transfer station D following which the copy sheet is transported to fusing station E where the developed image is permanently fixed on the copy sheet by cooperating heated fuser roller 42 and backup roller 44.

After fusing, the copy sheet may be inverted by a sheet inverter 50. An inverter selecting gate 45, when inoperative, bypasses sheet inverter 50 and sends the copy sheets to gate 38 and tray 39 or to transport 37. A deflector gate 49 routes the copies either into discharge path 30 or to duplex tray 28 which provides a buffer storage for those sheets which are also to be printed on the opposite side as well.

Input scanner section 7 employs one or more linear scanning arrays 60 which may for example comprise charge couple devices (CCD) supported below and in scanning relation to a transparent platen 62 by a carriage 64. Carriage 64 is in turn supported for reciprocating movement along a path paralleling platen 62 by rails 63. A drive screw 65 serves to move carriage 64 along rails 63, screw 65 being driven by a reversible motor 66 which selectively moves carriage 64 in either a forward or reverse scanning direction. A suitable lens 68 is provided to focus array 60 on a line-like segment of platen 62 and the document 70 resting thereon. A suitable lamp 71 illuminates the document line being scanned.

Array 60 provides electrical image signals or pixels representative of the document image scanned which, after suitable processing, are input to a suitable memory where the signals are stored pending use. As will be understood, the image signals may be used for purposes other than printing copies, as for example, the signals may be sent via a communication channel (not shown) to another location, or stored, etc.

Documents 70 to be scanned are brought from a document tray 88 forward by the document handler section 10 into position on platen 62 for scanning. Following scanning, the document handler returns the documents back to the document stack in the document tray 88.

While a particular document handler is shown, one skilled in the art will appreciate that other document handler types may be used instead or that the documents may be placed on the platen 62 manually.

Machine controller section 9, which controls operation of machine 5, has one or more microprocessors 55 together with suitable memory, 56 for storing machine operating programs and operator program instructions. The various operating components and sections of machine 5 are linked together as by means of communication channel 57.

Figure 3:
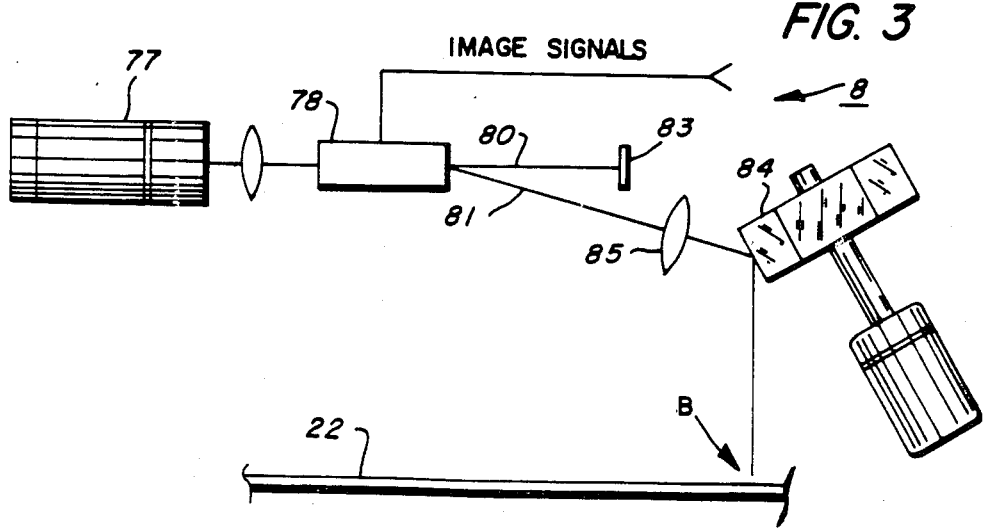
FIG. 3 is an enlarged view depicting the system for processing image signals together with details of the output scanning apparatus of the machine shown in FIG. 1.

Referring particularly to FIG. 3, raster output scanner section 8 includes a suitable source of high intensity light such as laser 77 modulated in accordance with the content of the image signals as by an acousto-optic modulator 78 to provide zero and first order imaging beams 80, 81. Beam 80 is impinged against a beam stop 83 while beam 81 is scanned across photoreceptor 22 at exposure station B by a scanning polygon 84 to expose the previously charged photoreceptor and create a latent electrostic image of the document represented by the image signals input to modulator 78. Suitable optical means such as lens 85 is provided to focus beam 81 on photoreceptor 22.

Figure 4:
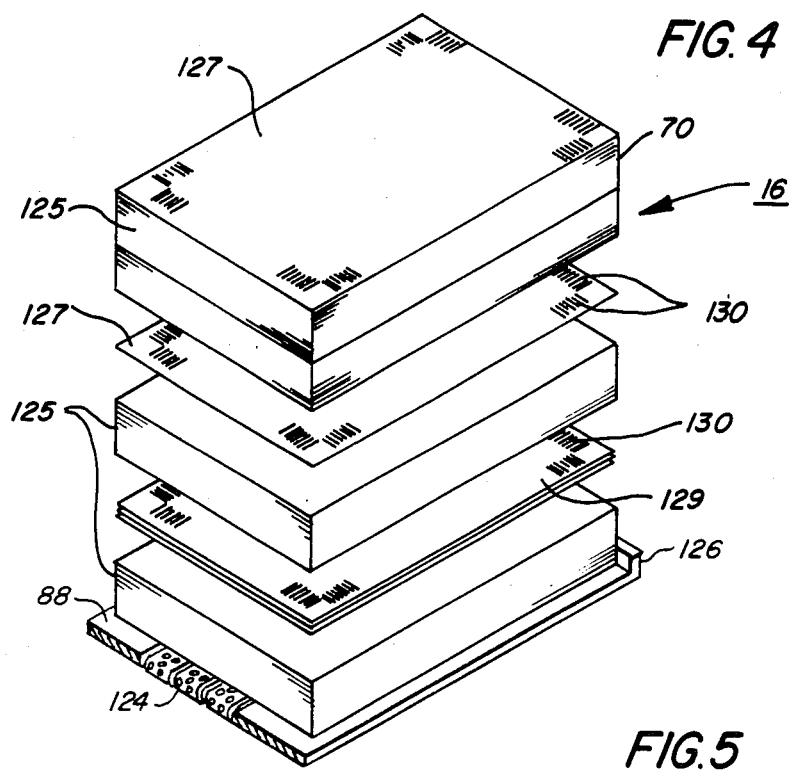
FIG. 4 is an isometric view showing a stack of documents arranged for scanning with the stack being segregated into individual jobs by job separators with individual jobs further subdivided by page separators.
Figure 5:
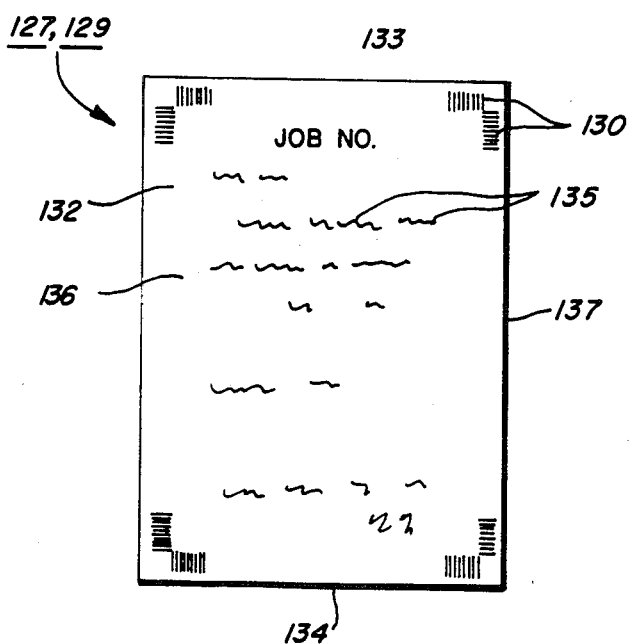
FIG. 5 is a plane view showing details of the job and page separators bearing coded indicia in the form of a bar code providing programming control data for a particular job.

Referring particularly to FIGS. 2, 4 and 5, to enhance machine efficiency, control sheets in the form of special documents are employed to segregate selected ones of the documents 70 in document handler 10 from one another and to input control or programming instructions to machine 5 for the particular documents associated with each control sheet. More specifically, the documents 70 in document handler 10 are batched, each batch 125 representing a particular job for machine 5. Batches 125 are segregated from one another by control sheets which are referred to herein as job separators 127, separators 127 bearing machine readable data in the form of an optically detectable code such as bar code 130 identifying the specific job to be performed by machine 5 on the batch 125 of documents with which the job separator 127 is associated.

Job exceptions, which represent a change in the programming parameters for one or more documents in a job batch 125, are handled by special documents termed page separators 129. Page separators 129 similarly bear machine readable data in the form of code 130, separators 129 typically providing control instructions which cause the machine 5 to process one or more documents within a batch 125 in a manner different from or as an exception to the rest of the batch. Following processing of the last exception document, the machine reverts back to processing the remaining documents of the batch in accordance with the control instructions of the job separator 127 for that particular batch until either the end of the batch is reached or another page separator 129 is encountered.

In addition to providing automatic operation of machine 5, page separators 129 can be programmed to interrupt further machine operation for the purpose of allowing the operator to intervene. Such operator intervention may be for the purpose of processing an oversized document such as a large drawing, or processing a book, etc.

The bar codes on separators 127, 129, when scanned by array 60, provide image signals identifying the specific job program represented by the job or page separator 127, 129 being scanned. The coded information on job and page separators 127, 129 respectively vary with different job programs, with the appropriate separator 127 or 129 being matched with the specific job program desired, and located within the document stack at the proper point. When using job and page separators, the operator first programs the particular job or job exception into the machine through the machine controller illustrated here by control panel 14 where the job program is stored in the machine memory. To enable the particular job that the operator programs to be matched with the correct document batch, or document(s) within a batch, a specific job identifier (e.g., a job number) which is the same as that represented by the image appearing on the job or page separator after decoding is also input to the machine by the operator with the job. The job or page separator is then placed, i.e., interleaved, with the documents at the correct position in the document tray 88. On subsequent scanning of the coded image on the job or page separator, the image signals are decoded and matched with the job identifier previously programmed into the machine. The machine then operates under the previously input job program instructions to carry out the job or job exception. Preferably, job and page separators 127, 129 are placed in tray 88 so as to be scanned ahead of the document or documents that are associated with the job or job exception represented by the individual separators.

By using job and page separators 127, 129 and the machine controller, the operator is able to pre-program different jobs which can be stacked in the document handler tray 88 at the same time. Since the present invention allows the job and page separators to be detected, read, and to be correlated or cross-referenced to pre-programmed machine features and functions, the machine controller 9, to which the control instructions derived from scanning a job and/or page separator interleaved with documents in tray 88 are input, can identify and separate jobs and electronically respond to different job parameters. As a result, separators 127, 129 provide a means for pre-programmed job batching and input batching, enhancing machine productivity and throughput. Additional uses for separators 127, 129 may be envisioned such as customer billing, user identification, etc.

Job and page separators may be generated by printing machine 5 itself or other suitable offsite devices capable of generating bar codes compatible with machine 5 may be used. Further, printing machine 5 or some other suitable bar code generating device may be used to in effect create one or more master job and/or sheet separators representing various job and exception programs which may then be reproduced as needed.

Job and page separators 127, 129 preferably comprise a sheet 132 having in the body thereof visual and readable information 135 which allows the operator to read and determine the job identifier (e.g., the job number) represented by the bar code 130 thereon. Preferably, the various job functions which the operator may select (i.e., paper tray to be used, number of prints, etc.) are also printed on separators 127, 129 to allow the operator, when inputting the job program to the machine 5, to mark or write (i.e., as by checking off) the particular job programmed. To facilitate reading bar code 130 and assure that code 130 is not missed or mis-read, each bar code 130 is preferably placed at several points on sheet 132, i.e. along the top and bottom margins 133, 134 of sheet 132 as well as along each side margin 136, 137, the latter assuring reading of code 130 whatever the orientation of sheet 132 in tray 88 of document handler 10. And to accommodate disposition of job or page separators 127, 129 wrong side up in document tray 88, the bar codes 130 are preferably placed on both sides of the sheet 132.

Job and page separators 127, 129 are brought by document handler 10 to platen 62 and located thereon in the same manner as are documents 70. Separators 127, 129 are optically scanned by array 60 in the same manner as are the documents 70. The image signals obtained by array 60 from scanning the bar code on separators 127, 129 are discriminated from the image signals obtained by scanning the documents 70, decoded, and the resulting control data input to the machine controller as will appear.

Figure 6:
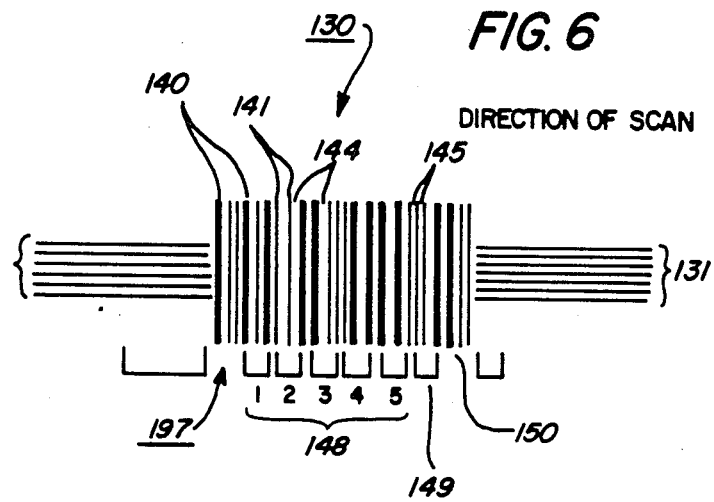
FIG. 6 is an enlarged view showing details of the bar code shown in FIG. 5.

Referring now to FIG. 6, the exemplary code 130 shown and described herein provides a pre-programmed list of job/page parameters that are referenced to a five digit number, termed a 'matrix 2 of 5 code'. As will be understood, the 'matrix 2 of 5 code' is composed of a series of wide and narrow black bars 140, 141 respectively and intervening wide and narrow white spaces 144, 145 therebetween. In this code type, a wide bar narrow white spaces 144, 145 therebetween. In this code type, a wide bar 140 or wide space 144 is used to represent a binary "1" while a narrow bar 141 or space 145 is used to represent a binary "0". Characteristics of this type code include 3 black spaces for each character, inter-character spaces, an even parity bit, a checksum character, and a unique start and stop pattern. Each character is five bits, with the least significant bit on the left (as shown in the drawing) and the parity bit following the most significant bit.

One complete bar code 130 consists of a start pattern 147, five message characters 148, and a checksum character 149 followed by a stop pattern 150. Thus, code 130 can encode up to 100,000 unique numbers.

Other code types and arrangements may instead be contemplated.

The bulk of decoding the bar code is done in software, minimizing hardware requirements. The prime function of the hardware (shown in FIG. 8) is to sense the black-to-white and white-to-black transitions within the bar code. Sampling is done only in a specific section of each coded separator 127, 129, preferably, in the approximate center of the bar code 130. In the exemplary arrangement shown, the sampling width is a block 5 pixels wide as shown at 131 in FIG. 6.

Figure 8:
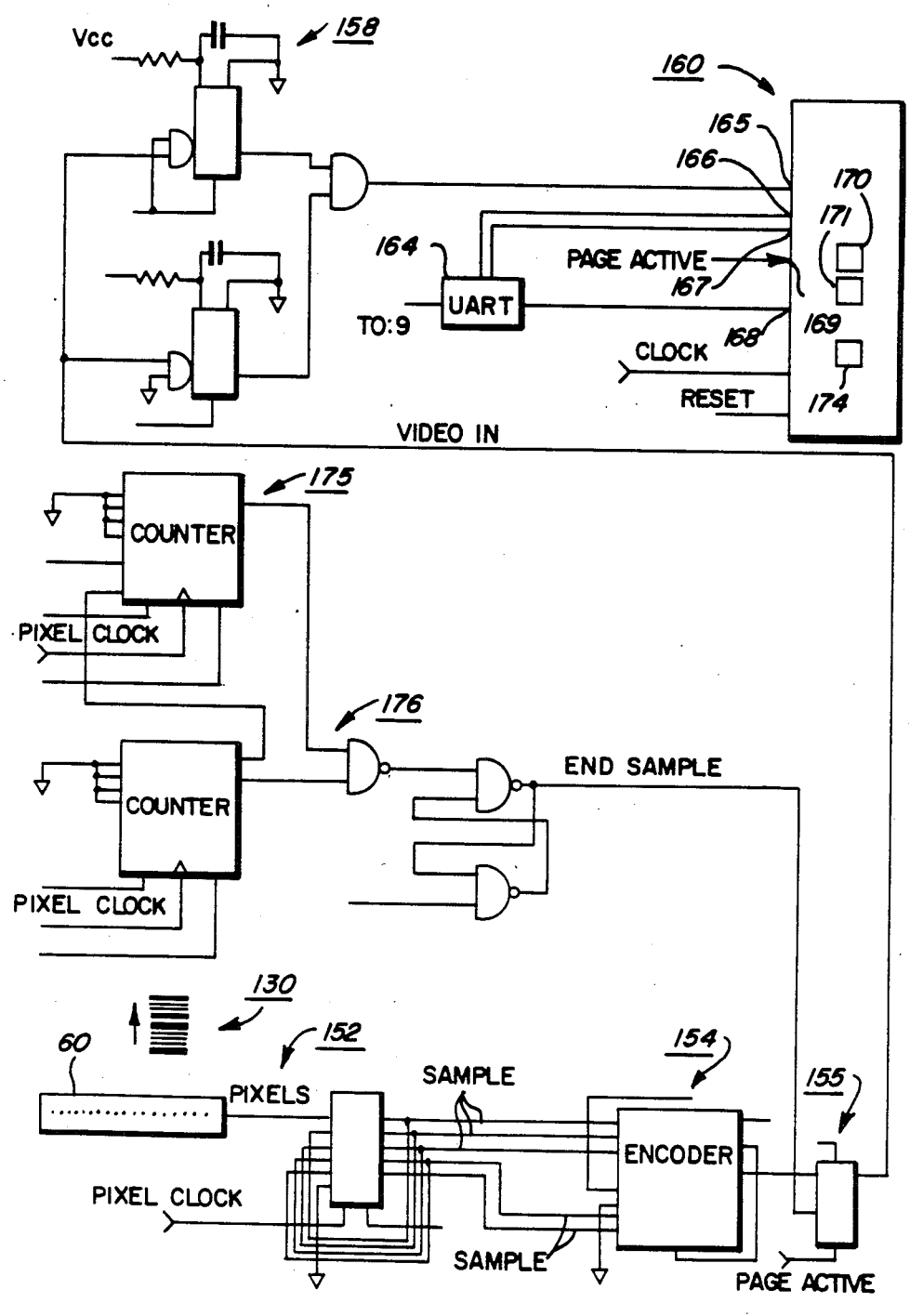
FIG. 8 is a schematic view of logic for reading bar codes on the job and page separators, distinguishing the bar code signals from document image signals, and processing and transmitting the bar code signals to provide programming control signals for a particular job function.

Referring particularly to FIG. 8, one pixel of scanned video is used for decoding. To compensate for noisy edges or any defect in the code 130, each block of pixels 131 is averaged to provide the one pixel sample per scanline. For this purpose, the pixels are input to a suitable serial to parallel converter 152, the output of which is fed to a 5-bit encoder 154 which averages the block of pixels to provide one bit (i.e. either a "1" or "0") to flip flop 155.

To limit scanning to block 131, a pixel counter 175 with decoding logic 176 is provided. Decoding logic 176 is programmed to provide an enabling signal (END SAMPLE) to flip flop 155 when counter 175 reaches a preset start scan count representing the first pixel sample of block 131 and to disable flip flop 155 when the count on counter 175 reaches a preset end scan count. When enabled, flip flop 155 passes the pixel output of encoder 154 to a suitable transition sensor 158 such as a dual monostable multi-vibrator.

Figure 7:
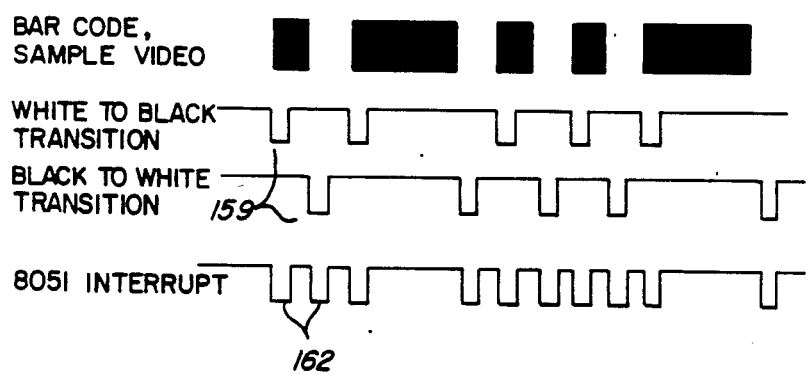
FIG. 7 is a timing chart depicting sampled video from an exemplary bar code and the resulting interrupt signals that are derived therefrom.

Referring now also to FIG. 7, transition sensor 158 outputs a low pulse signal 159 at each transition from "1" to "0" (i.e. from black-to-white) and from "0" to "1" (i.e. from white-to-black) in the signal input from flip flop 155 to provide interrupt signals 162. Signals 162, which serve as an external interrupt, are input to a microcontroller chip 160 such as an Intel Model 8051 microcontroller. As will appear, chip 160 is programmed with decoding software which identifies the presence of a job or page separator 127, 129 bearing bar code 130. Where a coded separator 127, 129 is present, the bar code 130 is decoded to provide program control signals to the machine controller section 9. In this process, the software measures the time between interrupts to distinguish wide and narrow bars 140, 141 and spaces 144, 145 from one another, thus decoding the interrupts into binary "1's" and "0's".

Four I/O ports 165, 166, 167, 168 of microcontroller chip 160 are used for data transmission, with port 165 being for input of the interrupt signals 162 from transition sensor 158 to chip 160, port 166 for outputting serial data from chip 160 via a universal asynchronous receiver-transmitter (UART) 164 to the machine controller section 9, port 167 for inputting serial data from the machine controller section 9 via receiver-transmitter 164 to chip 160, and port 168 for inputting enabling Clear To Send (CTS) signals to chip 160 from receiver-transmitter 164. Receiver-transmitter 164 converts serial data output of chip 160 from port 166 to parallel data that can be read by the machine controller section 9 and converts parallel data from controller section 9 to asynchronous serial data for transmission back to chip 160 through port 167. An additional port 169 receives a page condition (Page Active) signal from the machine controller section allowing chip 160 to know when to begin processing. The chip interrupt service routine and chip on-board timers 170 and 171 and RAM buffer 174 handle data transfer timing.

As will appear, software is used to decode bar and space widths, a software loop incrementing a running width count using an on-board counter 172 of chip 160 until the next interrupt occurs indicating a signal transition 162. An interrupt service routine reads the count on the counter 172 and stores the value in internal buffer 174. Following this, the count loop is resumed, resetting the counter to zero. The end of the bar code 130 is presumed to occur when the buffer 174 address reaches a predetermined maximum value corresponding to the number of transitions in a typical code or the end margin is reached.

The characters in the bar code 130 are reconstructed by converting the width counts to binary values of "1" or "0" based on whether the width is greater than or less than a threshold value T. For this purpose, the counts stored in buffer 174 are compared with a threshold T which is continuously updated to compensate for differences in scanning speed as well as random errors such as video noise or copy quality defects within the scanned code by averaging the width counts of the last logic "0" and logic "1".

Once characters have been formed, a parity check and a checksum character check is performed. The five message characters are then converted to standard 7 bit ASCII format plus an even parity bit by adding a constant of 30 HEX to the weighted sum of each character's bits. The five ASCII message characters are transmitted serially to the machine controller.

Decoding software also performs the tasks of recognizing start and stop patterns 147, 150 in the bar code, error checking including a parity check on each character, a checksum character check, and serial transmission of the decoded message to the machine controller section in standard 7 bit ASCII plus even parity format.

Figure 9:
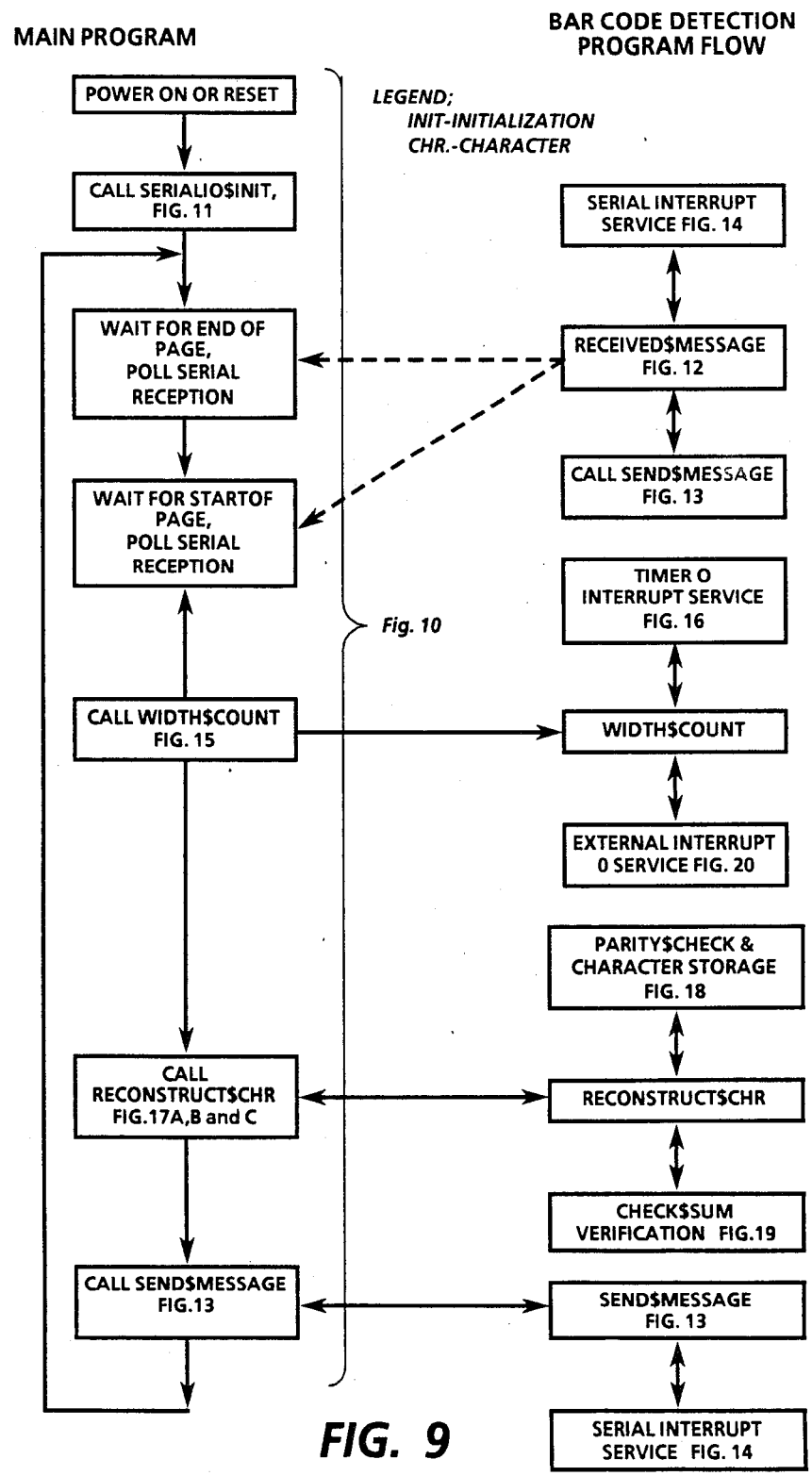
FIG. 9 is a flow chart depicting overall program flow.

Referring now to the program flow chart of FIG. 9 and the flow charts of FIGS. 10a–21, in the main operating program (FIGS. 10a and 10b), after initializing steps, the serial input/output initializing routine (FIG. 11) is called (CALL Serial I/O Init.). In this routine, the serial communication ports 166, 167 of chip 160 are initialized to the 8 bit mode of receiver/transmitter 164, enabling serial communication between chip 160 and receiver-transmitter 164. Additionally, chip on-board timer 171 is initialized as a baud rate generator, the baud rate is set, and timer 171 turned on.

Referring again to FIGS. 9 and 10a and 10b, if video has just been processed, a wait loop (Wait for end of page, poll serial reception) is entered waiting until the end of the current scanned page. During this loop, communication port 169 of chip 160 is polled for serial reception of a message (Rec'd$Msg$Flag=True?). If True, a received message subroutine is called (Call Received $ Message—FIGS. 11a and b). If there were problems in the previous message, a request for re-transmission can be serviced here (Call Send $Message—FIG. 12). This loop is held until the end of the current page following which a second wait loop (Wait for start of page, poll serial reception) is entered waiting for an active page to begin processing. In this loop, communication port 169 of chip 160 is polled for serial reception of a message (Active Page?). On a Page Active signal, the loop is exited, the timer 170 interrupt enabled (Timer 170 Interrupt Service—FIG. 16), and the "Call Width Count" routine (FIGS. 15a,b and c) is entered.

In this routine, timer 170, which functions as a variable count timer, is initialized to zero and to operate as an 8-bit auto-reload counter set to over flow every 100 usec. The address (I) of buffer 174, which functions as a count buffer, is initialized to zero. Timer 170 is turned on and a loop test variable is initialized. A loop (COUNT LOOP) is made until the width of the start margin is checked to determine if there is a bar code 130 present on the page, or if the count buffer 174 has filled up, or if a valid bar code end margin has been identified. The loop is interrupted by an external interrupt on each video transition 159 or on each overflow of timer 170 on expiration of the 100 usec. interval.

The total number of overflows of timer 170 that have occurred between external interrupts, which identify and distinguish wide bars and spaces 140, 144 respectively of bar code 130 from narrow bars and spaces 141, 145 respectively, is stored in the count buffer 174. Where the number of overflows is less than a predetermined number representing the end of bar code (i.e. Interrupts $I \leq =47$), the number of times overflow occurs is stored along with the last buffer 174 address that an overflow occurred. The address of buffer 174 is indexed with each external interrupt on each video transition 162. A check is made to see if more than a predetermined number of overflows (i.e., 13) have occurred (Overflow count > 13?). If so, there is no bar code 130 on the page, the EXIT routine (FIG. 21) is called (CALL Exit) and the message "No Bar Code" sent. Should overflows of counter 170 occur after the bar code end (i.e. $I \geq =47$?), it is assumed to be the bar code end margin and the number of overflows are recorded (End$Margin$Cnt=End$Margin$Cnt+255). Where the number of variable COUNT overflows divided by the contents of the last buffer location is greater than 8 (i.e. End$Margin$Cnt/Buffer $(1-1)>8$?), a valid end of margin is identified and this phase of processing ends and control passes back to the main routine.

When the address of count buffer 174 equals 10 (I=10?), a search for the start margin is begun. If the variable 'COUNT' has overflowed, all the contents of the buffer prior to and including the contents of the last buffer address are combined. To this is added the number of overflows and the resulting value stored as the bar code start margin. This takes into account the case where there are copy quality defects in the start margin. The routine is exited and timer 170 turned off and all interrupts except the serial interrupt are disabled. The "Reconstruct Chr" routine (FIGS. 17a,b) is called.

As a result, the count buffer 174 contains time interval counts representing the widths of the bars 140, 141 and spaces 144, 145 in the entire message from the "Width Count" routine. After initializing steps, a check is made to see if the start margin detected is too wide by comparing the count in the count buffer with a preselected number (Temp Cnt>46?). If so, the EXIT routine (FIG. 21) is called and the message "No Bar Code" sent.

The message characters are then reconstructed by converting the width counts to binary values of 1 or 0. The counts are sorted into wide and narrow elements depending on whether their width is greater than or less than a threshold value (Next$Cnt>T?). The initial threshold value T for a wide element is a nominal value set to the average of the first bar+first space (Threshold T=Buffer 1+buffer 2/2) to maintain scan speed independence. Once into the bar code, if the present bit (Next$Cnt) is a different value than the last bit (Prev$Cnt), the threshold is re-calculated (i.e. Prior Bit=0?, or Prior Bit=1?). The new threshold is determined by taking the values of the last logic "0" and logic "1" counts and averaging them (T=Next$Cnt+Prev.Cnt/2). The next width count (Next$Cnt) is compared against this new threshold (NEXT$CNT>T?).

The bar code start 147 (1st Char) and stop 150 (CHR$Cnt>6) character are verified (i.e. Start Char. Verify). If either the start or stop the characters do not verify, the routine is exited (Call Exit) and the message "No Bar Code" sent.

The character reconstruction process begins by checking the start margin to determine where the first bit of the character is (CHR$CNT=CHR$CNT+1). After determining the logic value of each bar and space, the value is shifted into the least significant bit (LSB) of a temporary register. The end of the character is found by placing a detection bit in the register prior to decoding any bits following which the register's most significant bit (MSB) is tested for the detection bit which indicates that the full character is in the register. The register is reinitialized with the detection bit and the intercharacter space count skipped. A variable (Char$Cnt) is used to keep track of the character being decoded. After each character has been reconstructed, a parity check (CALL Parity Check—FIGS. 18a,b) is done and character stored (except for the start and stop characters), followed by a checksum verification procedure on character 149 (CALL Checksum Verification—FIG. 19). Processing is aborted if either a parity check failure or a checksum error is detected and the exit routine (FIG. 21) called.

On completion, the Send Message routine (FIG. 13) is called. In this routine, the ASCII equivalent of the character is calculated (ASCII$CHAR=ASCII$Char+30H) and even parity is added. The message is saved in case re-transmission is needed. A wait loop is entered while polling the port bit 169 for a CTS signal from receiver/transmitter 164. When the CTS signal goes low, the message is transmitted from port 166 to the machine controller section 9 via receiver/transmitter 162. Then a loop is entered testing a test variable which will be set false by occurrence of the Serial Interrupt Service Routine, indicating the end of the character has been sent.

We claim:

1. In a electronic reprographics/printing machine for processing documents having images thereon, said machine having a document scanner which scans said documents to provide electrical signals representative of the images on said documents for processing by said machine, the combination of:
   (a) control means for controlling operation of said machine in response to control instructions;
   (b) a control document bearing at least one coded image providing control instructions for operating said machine to carry out a preset cycle, said control document being associated with said documents to provide at least one job batch consisting of said documents and said control document for scanning by said scanner so that said scanner when scanning said job batch outputs both electrical signals representative of the images on said documents and electrical signals representative of the coded image on said control document;
   (c) control document recognition means for separating the electrical signals output by said scanner from scanning said coded image on said control document from the electrical signals output by said scanner from scanning said documents; and
   (d) means for converting the electrical signals from scanning said coded image on said control document to said control instructions for controlling operation of said machine.

2. The machine according to claim 1 in which said control document comprises a job separator having control instructions for processing said job batch.

3. The machine according to claim 1, in which said control document comprises a page separator having control instructions for processing one or more documents in said job batch.

4. In a electronic reprographics/printing machine, the combination of:
   (a) a document scanner for scanning a combination of documents and control documents together in succession, each of said documents and said control documents having images, said scanner outputting a succession of image signals representative of both said images on said documents and said images on said control documents, said documents and said control documents being combined with one another to form batches with at least one control document associated with each batch;
   (b) control means for controlling operation of said machine in response to control instructions;
   (c) the images on said control documents, when scanned by said scanning means providing control instructions in the form of said image signals for operating said machine to carry out a preset cycle for the job batch with which said control documents are associated;
   (d) control document recognition means for separating from said succession of image signals output by said scanner image signals from scanning images on said control documents from image signals from scanning images on said documents in said batch to provide separated image signals; and
   (e) means for converting said separated image signals from scanning images on said control documents to said control instructions for input to said control means.

5. The machine according to claim 4 including second control documents for combining with said documents and said control documents at selected points within said batches, said second control documents having an image which when scanned by said scanner provides temporarily changed control instructions to said control means for at least one of said documents within the batch with which said second control documents are associated,
   said control means reverting back to said control instructions when processing of said one document is completed.

6. The machine according to claim 1 in which said coded images are in the form of a bar code.

7. The machine according to claim 1 in which said control sheet recognition means inhibits printing of said control documents.

8. The machine according to claim 5 in which images on said control documents are in the form of a bar code.

9. In an electronic reprographics/printing machine for processing documents having images thereon, said machine having a document scanner with at least one CCD array which scans said documents line by line to provide electrical signals representative of the images on said documents for processing by said machine, the combination of:
   (a) document support means for holding a supply of said documents for scanning;
   (b) document transport means;
   (c) control means for controlling operation of said machine;

(d) at least one job separator in said supply of documents having an image representing control instructions for operating said machine to carry out a preset cycle;

(e) said transport means bringing said documents including said job separator from said document support means into scanning relation with said array whereby said array scans said documents including said job separator line by line successively in the order presented to said array to provide image signals representing said document images and image signals representing said job separator image;

(f) means for separating said image signals derived from scanning said job separator by said array from said image signals derived from scanning said documents by said array; and (g) means providing control instructions from said image signals derived from scanning said job separator for operating said machine to carry out said preset cycle.

10. The machine according to claim 9 in which said job separator is positioned so as to be scanned prior to scanning of said documents associated with said preset cycle.

11. The machine according to claim 9 including at least one page separator having an image representing control instructions for operating said machine to temporarily alter said preset cycle, said page separator being interleaved with said documents and said job separator in said tray for scanning after said job separator but prior to scanning of said one document.

12. The machine according to claim 11 in which said page separator has an image representing control instructions providing a substitute program for temporarily changing said preset cycle.

13. The machine according to claim 9 in which said job separator image comprises a machine readable bar code.

14. The machine according to claim 11 in which the image on said job and page separators comprises a machine readable bar code.

15. The machine according to claim 11 in which said bar code is duplicated in at least two distinct and separate areas of said job and page separators to assure scanning by said array.

16. The machine according to claim 14 in which said bar code is provided on each side of said job and page separators.

17. The method of operating an electronic reprographics/printing machine to process documents for printing, the machine including a single scanning unit for scanning documents bearing images and converting said images to image signals, means for processing the image signals to provide a desired output, and control means responsive to job control instructions for controlling said machine to provide said desired output, the steps comprising:

(a) programming said machine with a preset job program for processing predetermined documents assembled in a job batch;

(b) assigning a job code number to said job program;

(c) inputting said job code number to said machine;

(d) providing a special document in the form of a job separator having an image thereon electronically representing said job code number for combination with the documents in said job batch such that when said job separator image is scanned, image signals are produced representing said job code number;

(e) combining said job separator with the documents in said job batch at a predetermined location in said job batch;

(f) sequentially scanning said documents including said job separator in said job batch and converting the document images to image signals;

(g) identifying image signals derived from scanning the image on said job separator from image signals derived from scanning images on said documents in said job batch; and (h) converting the image signals from said job separator to said job code for input to said control means, said control means matching the job code derived from scanning said job separator with the job code previously programmed into said machine to provide said preset job program for processing the documents in said job batch.

18. The method according to claim 17 including the step of providing an image in the form of a bar code on said job separator.

19. The method of operating a electronic reprographics/printing machine to process documents for printing, the machine including a single scanning unit for scanning image bearing documents and converting said images to image signals, means for processing the image signals to provide a desired output, and control means responsive to job control instructions for controlling said machine to provide said print output, the steps of:

(a) programming said machine with a preset job program for processing documents assembled in a job batch together with a job code;

(b) providing a special document in the form of a job separator having an image thereon representing said job code for combination with the documents in said job batch;

(c) combining said job separator with the documents in said job batch at a location in said job batch where said job separator is scanned first;

(d) additionally programming said machine with at least one preset job exception program for processing predetermined ones of the documents in said job batch differently together with a job exception code;

(e) providing a special document in the form of a page separator having an image thereon representing said job exception code in said job batch;

(f) combining said page separator with the documents in said job batch at a location in said job batch where said page separator is scanned after said job separator but before said certain documents in said job batch are scanned;

(g) sequentially scanning said documents in said job batch and converting said images to image signals;

(h) identifying image signals derived from scanning the image on said job separator and image signals derived from scanning the image on said page separator from image signals derived from scanning images on said documents in said job batch;

(i) converting the image signals from said job separator to said job code for input to said control means, said control means matching the job code derived from scanning said job separator with the job code previously programmed into said machine to provide said preset job program for processing the documents in said job batch; and (j) converting the image signals from said page separator to said job exception code for input to said control means, said control means matching the job exception code derived from scanning said page separator with the job exception code previously programmed into said machine to provide said preset job exception program for processing the documents in said job batch.

* * * * *